US011405170B2

(12) United States Patent
Takeda et al.

(10) Patent No.: US 11,405,170 B2
(45) Date of Patent: Aug. 2, 2022

(54) TERMINAL, RADIO COMMUNICATION METHOD, AND BASE STATION

(71) Applicant: NTT DOCOMO, INC., Tokyo (JP)

(72) Inventors: Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 17/009,371

(22) Filed: Sep. 1, 2020

(65) Prior Publication Data

US 2020/0403765 A1 Dec. 24, 2020

Related U.S. Application Data

(63) Continuation of application No. 16/307,541, filed as application No. PCT/JP2017/021324 on Jun. 8, 2017, now abandoned.

(30) Foreign Application Priority Data

Jun. 10, 2016 (JP) .............................. JP2016-116282

(51) Int. Cl.
*H04L 5/00* (2006.01)
*H04W 72/04* (2009.01)
(Continued)

(52) U.S. Cl.
CPC .......... *H04L 5/0098* (2013.01); *H04L 5/0094* (2013.01); *H04L 27/2607* (2013.01);
(Continued)

(58) Field of Classification Search
CPC . H04L 5/0098; H04L 5/0094; H04L 27/2607; H04L 5/001; H04W 24/10;
(Continued)

(56) References Cited

U.S. PATENT DOCUMENTS

2010/0118836 A1\* 5/2010 Kazmi ................ H04L 27/2618
370/336
2013/0142076 A1 6/2013 Ramos et al.
(Continued)

FOREIGN PATENT DOCUMENTS

JP 2017-208587 A 11/2017
WO 2016/137821 A1 9/2016

OTHER PUBLICATIONS

International Search Report issued in PCT/JP2017/021324 dated Aug. 29, 2017 (2 pages).
(Continued)

*Primary Examiner* — Eunsook Choi
(74) *Attorney, Agent, or Firm* — Osha Bergman Watanabe & Burton LLP

(57) ABSTRACT

A terminal is disclosed including a receiver that receives a command to command at least one of activation and deactivation for a first cell that is configured with a short TTI having a shorter TTI length than a subframe and a processor that controls at least one of an activation operation and a deactivation operation of the first cell in units of a subframe based on the command. In other aspects, a radio communication method and base station are also disclosed.

5 Claims, 14 Drawing Sheets

(51) Int. Cl.
  *H04W 72/12* (2009.01)
  *H04L 27/26* (2006.01)
  *H04W 24/10* (2009.01)
  *H04W 80/02* (2009.01)
(52) U.S. Cl.
  CPC ........... *H04W 24/10* (2013.01); *H04W 72/04* (2013.01); *H04W 72/0453* (2013.01); *H04W 72/12* (2013.01); *H04W 80/02* (2013.01); *H04L 5/001* (2013.01)
(58) Field of Classification Search
  CPC . H04W 72/04; H04W 72/0453; H04W 72/12; H04W 80/02
  See application file for complete search history.

(56) References Cited

U.S. PATENT DOCUMENTS

| | | | |
|---|---|---|---|
| 2016/0119925 A1 | 4/2016 | Roessel et al. | |
| 2016/0205696 A1* | 7/2016 | Chen | H04W 72/0453 370/329 |
| 2016/0255611 A1 | 9/2016 | Damnjanovic et al. | |
| 2018/0359068 A1* | 12/2018 | Kim | H04W 72/14 |
| 2018/0375636 A1* | 12/2018 | You | H04L 5/001 |
| 2019/0268128 A1* | 8/2019 | Zhou | H04L 1/1887 |
| 2020/0413380 A1 | 12/2020 | Shimezawa et al. | |

OTHER PUBLICATIONS

Written Opinion of the International Searching Authority issued in PCT/JP2017/021324 dated Aug. 29, 2017 (6 pages).
InterDigital Communications; "Support for Short TTIs and Processing Times in LTE"; 3GPP TSG-RAN WG1 #83, Tdoc R1-157136; Anaheim, USA; Nov. 16-20, 2015 (6 pages).
NTT DOCOMO; "Discussion for CSI reporting methodologies related to CA activation/de-activation time"; 3GPP TSG-RAN WG4 Meeting #64, R4-124364; Qingdao, P.R. China; Aug. 13-17, 2012 (5 pages).
Nokia Corporation; "Scell activation time for CA"; 3GPP TSG-RAN4 #64bis, R4-125557; Santa Rosa, USA; Oct. 8-12, 2012 (2 pages).
Samsung; "Considerations on activation time for CA"; 3GPP TSG-RAN WG4 Meeting #64, R4-124128; Quindao, China; Jun. 13-17, 2012 (3 pages).
MediaTek; "SCell activation time under various working assumptions R10"; 3GPP TSG-RAN4 Meeting #64, R4-123825; Quindao, China; Aug. 13-17, 2012 (4 pages).
3GPP TS 36.300 V12.4.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)"; Dec. 2014 (251 pages).
3GPP TSG RAN Meeting #70; RP-151891; "New WI proposal: Advanced Carrier Aggregation Techniques for LTE" Huawei, HiSilicon; Sitges, Spain; Dec. 7-10, 2014 (8 pages).
3GPP TSG RAN WG1 Meeting #84; R1-160966; "Discussions on TTI shortening" NTT DOCOMO, Inc.; St Julian's, Malta; Feb. 15-19, 2016 (6 pages).
Extended European Search Report issued in European Application No. 17810396.6, dated Nov. 20, 2019 (10 pages).
3GPP TSG RAN Meeting #70; RP-151891; "New WI proposal: Advanced Carrier Aggregation Techniques for LIE" Huawei, HiSilicon; Sitges, Spain; Dec. 7-10, 2014 (8 pages).
Office Action issued in the counterpart Japanese Patent Application No. 2018-521776, dated Apr. 27, 2021 (6 pages).
Office Action issued In European Application No. 17810396.6 dated Aug. 30, 2021 (5 pages).

* cited by examiner

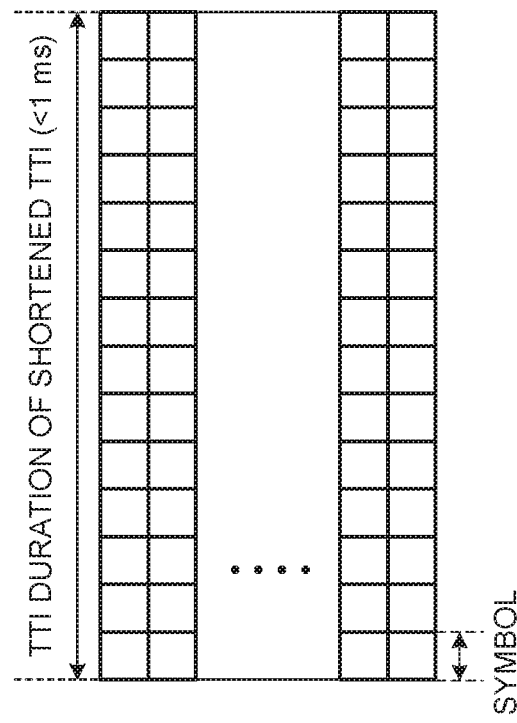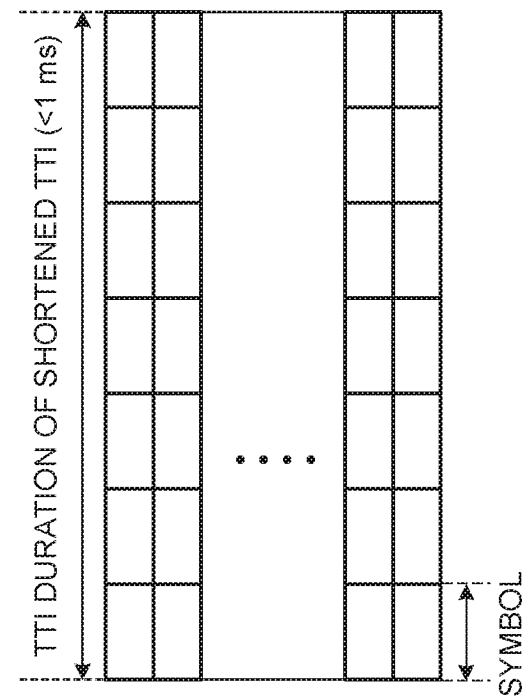
FIG. 3A
FIG. 3B

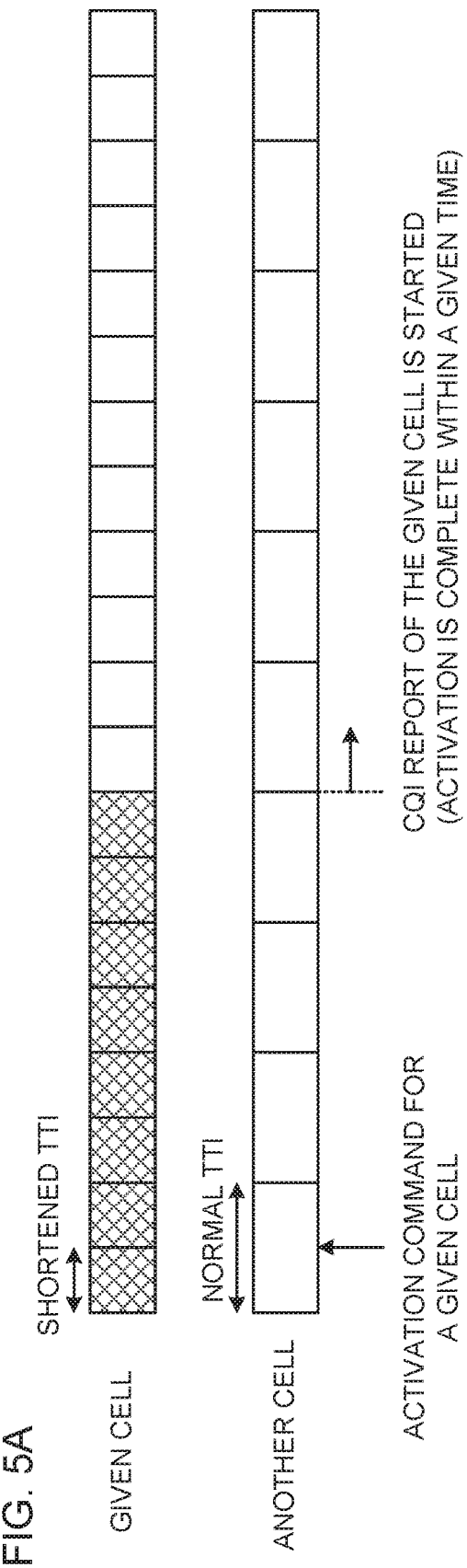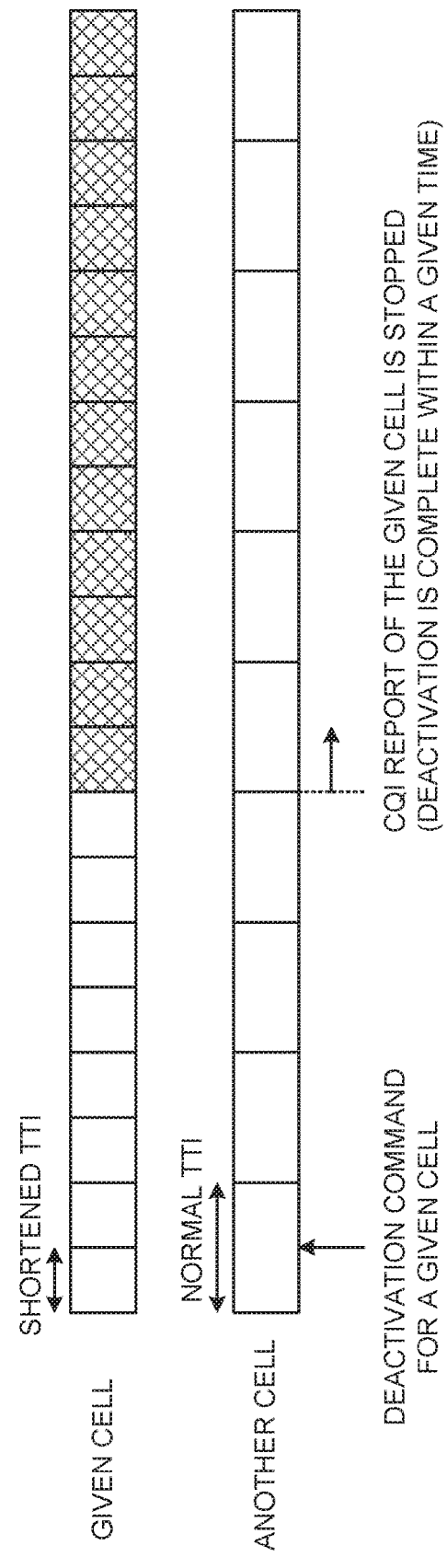

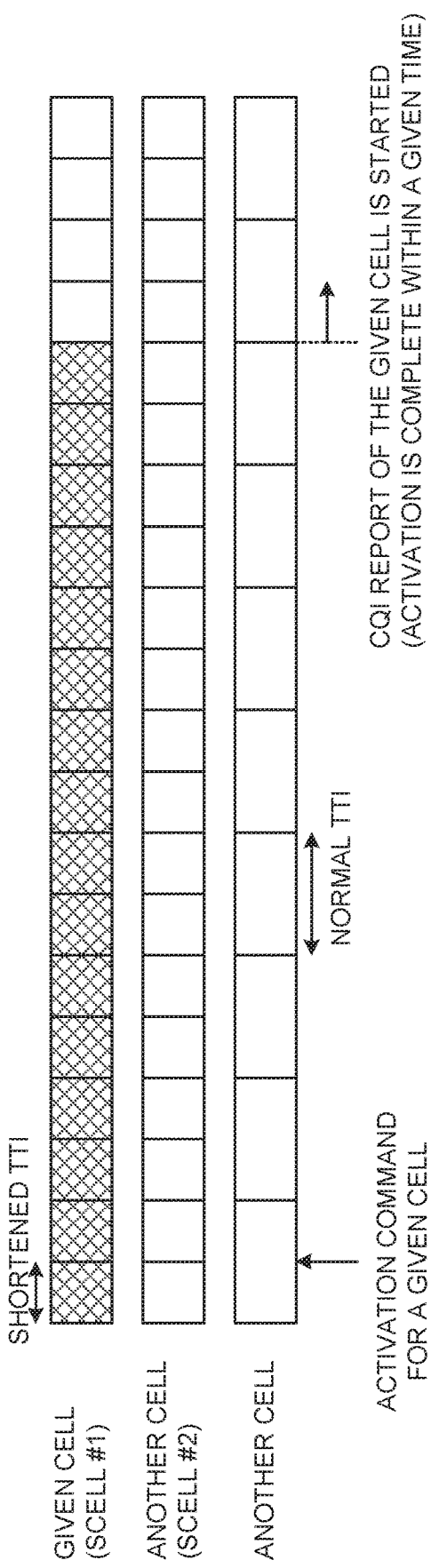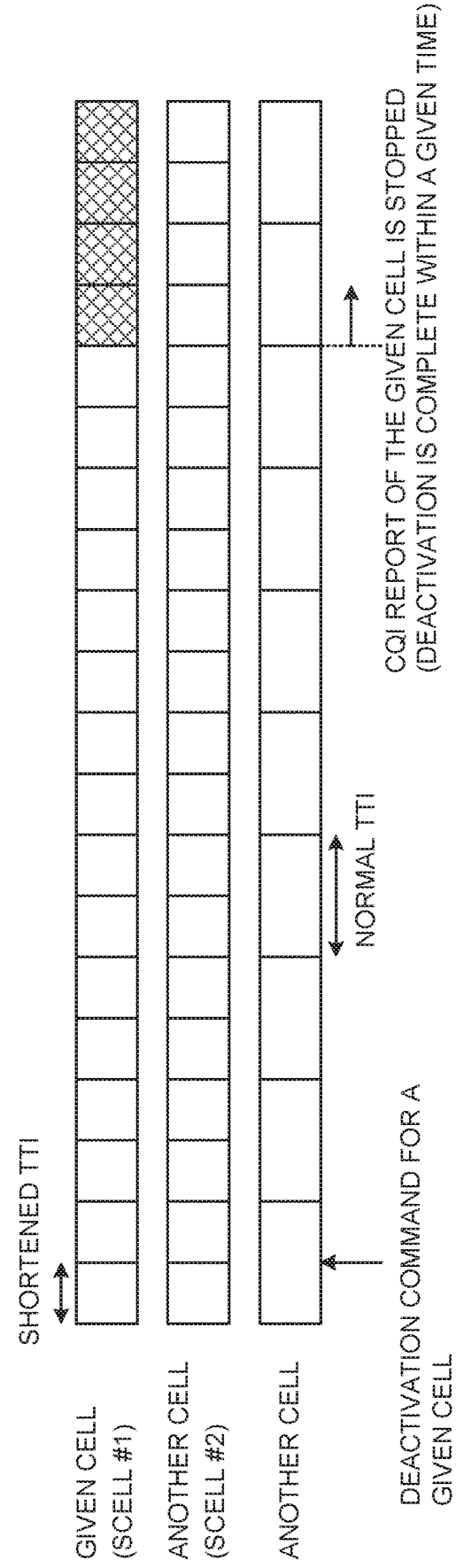

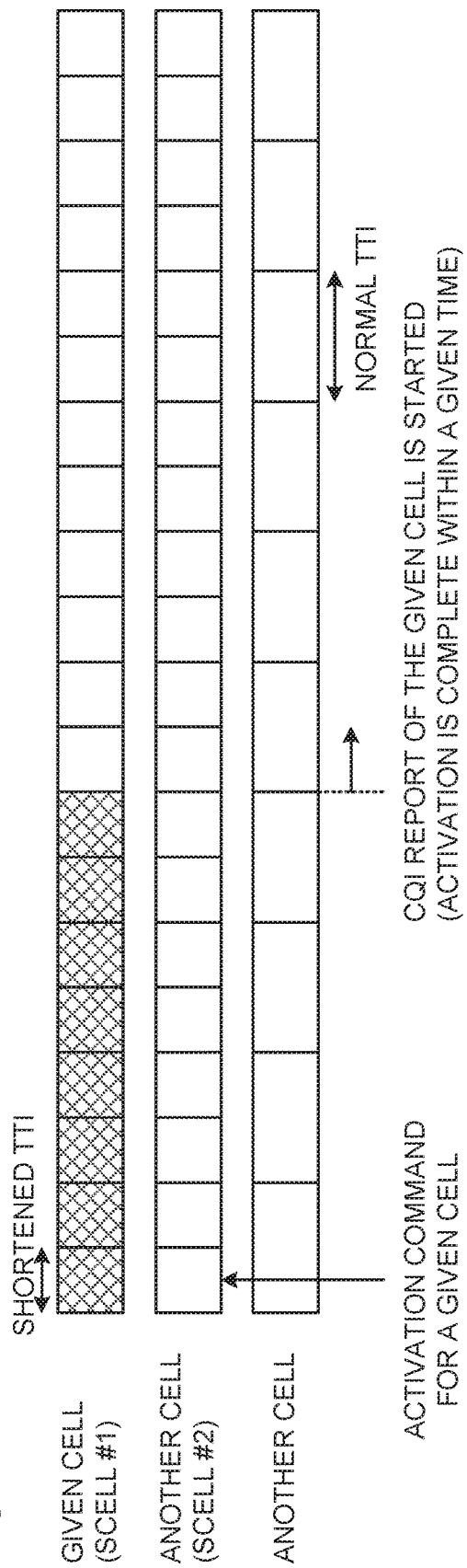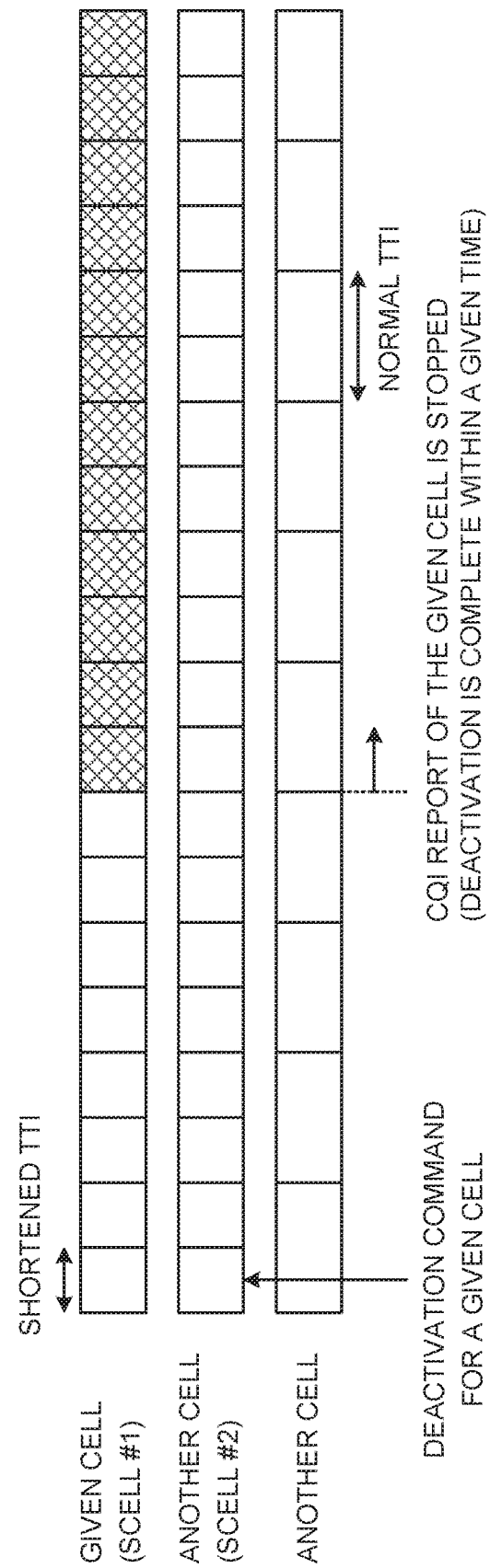

TERMINAL, RADIO COMMUNICATION METHOD, AND BASE STATION

CROSS-REFERENCE TO RELATED APPLICATIONS

This application is a continuation application of U.S. patent application Ser. No. 16/307,541, filed on Dec. 6, 2018, which is a national phase application of PCT/JP2017/021324, filed on Jun. 8, 2017, which claims priority to Japanese Patent Application No. 2016-116282, filed on Jun. 10, 2016. The contents of these applications are hereby incorporated by reference in their entirety.

TECHNICAL FIELD

The present invention relates to a user terminal, a radio base station and a radio communication method in a next-generation mobile communication system.

BACKGROUND ART

In the UMTS (Universal Mobile Telecommunications System) network, the specifications of long term evolution (LTE) have been drafted for the purpose of further increasing high speed data rates, providing lower latency and so on (see non-patent literature 1). The specifications of LTE-advanced (also referred to as LTE "Rel. 10," "Rel. 11" or "Rel. 12") have been drafted for the purpose of further broadbandization and higher speed beyond LTE (also referred to as "LTE Rel. 8"), and its successor systems (LTE Rel. 13 and later versions) are also under study.

In LTE Rel. 10/11, carrier aggregation (CA) to integrate multiple component carriers (CC) is introduced in order to achieve broadbandization. Each CC is configured with the system bandwidth of LTE Rel. 8 as one unit. In addition, in CA, multiple CCs under the same radio base station (eNB: eNodeB) are configured in a user terminal (UE: User Equipment).

Meanwhile, in LTE Rel. 12, dual connectivity (DC), in which multiple cell groups (CGs) formed with different radio base stations are configured in a user terminal, is also introduced. Each cell group is comprised of at least one cell (CC). In DC, multiple CCs of different radio base stations are aggregated, so that DC is also referred to as "inter-eNB CA."

When CA is used, a primary cell (PCell), which is a cell of high reliability that ensures connectivity, and a secondary cell (SCell), which is an adjunct cell, are configured in a user terminal.

The UE can first connect to the PCell and add the SCell if necessary. PCell is a single cell (standalone cell) that supports RLM (Radio Link Monitoring), SPS (Semi-Persistent Scheduling), and the like. SCell is a cell that is configured in UE in addition to PCell.

SCell is added and deleted by RRC (Radio Resource Control) signaling. SCell is in a deactivated state immediately after being added to the user terminal, and can only perform communication (scheduling) after being activated.

Also, in existing systems (LTE Rel. 8 to 12), frequency division duplex (FDD), in which downlink (DL) transmission and uplink (UL) transmission are made in different frequency bands, and time division duplex (TDD), in which DL transmission and UL transmission are switched over time and made in the same frequency band, are introduced.

In such existing systems, the transmission time intervals (TTIs) that are applied to DL transmission and UL transmission between radio base stations and user terminals are configured to 1 ms and controlled. A transmission time interval is also referred to as a "communication time interval," and a TTI in LTE systems (Rel. 8 to 12) is also referred to as a "subframe duration."

CITATION LIST

Non-Patent Literature

Non-Patent Literature 1: 3GPP TS 36.300 "Evolved Universal Terrestrial Radio Access (E-UTRA) and Evolved Universal Terrestrial Radio Access Network (E-UTRAN); Overall Description; Stage 2"

SUMMARY OF INVENTION

Technical Problem

Future radio communication systems (for example, 5G, NR (New RAT), etc.) are anticipated to realize various radio communication services so as to fulfill mutually varying requirements (for example, ultra-high speed, large capacity, ultra-low latency, etc.).

For example, 5G is under research to provide radio communication services referred to as "eMBB (enhanced Mobile Broad Band)," "IoT (Internet of Things)," "MTC (Machine Type Communication)," "M2M (Machine To Machine)," "URLLC (Ultra Reliable and Low Latency Communications)," and so on. Note that, depending on the communicating device, M2M may be referred to as "D2D (Device To Device)," "V2V (Vehicular To Vehicular)," and/or the like. To fulfill the requirements for the above-mentioned various kinds of communication, studies are going on to design a new communication access scheme (new RAT (Radio Access Technology)).

Reduction of communication delay (latency reduction) is under research in order to provide sufficient communication services in such future radio communication systems. For example, a study is in progress to make the transmission time interval (TTI) that serves as the minimum time unit in scheduling shorter than 1 ms in existing LTE systems (LTE Rel. 8 to 12), and communicate by using these TTIs (which may be referred to as, for example, "shortened TTIs").

However, although, in existing LTE systems, timing control in communication is carried out in units of subframes (1 ms), how to control communication when communication is carried out by introducing shortened TTI is not decided yet. Therefore, a control method to enable proper communication when communication is carried out by introducing shortened TTIs is in demand.

For example, although, in CA for existing LTE systems, the operation period (latency time) of activation/deactivation of SCells is defined in units of normal subframes (1 ms), what kind of control should be applied when shortened TTIs are introduced poses a problem.

The present invention has been made in view of the above, and it is therefore an object of the present invention to provide a user terminal and a radio communication method, whereby predetermined cells can be activated and/or deactivated properly even when shortened TTIs are used.

Solution to Problem

In accordance with one aspect of the present invention, a user terminal, which communicates with a plurality of cells, including a given cell in which a shortened TTI having a TTI duration shorter than 1 ms is configured, has a receiving section that receives an activation command and/or a deactivation command directed to the given cell, and a control section that controls activation of the given cell based on the activation command and/or controls deactivation of the given cell based on the deactivation command, and the control section controls an operation period for activation and/or deactivation of the given cell based on the TTI duration in the given cell, or a TTI duration in a cell where the activation command and/or the deactivation command is received.

Advantageous Effects of Invention

According to the present invention, predetermined cells can be activated and/or deactivated properly even when shortened TTIs are used.

BRIEF DESCRIPTION OF DRAWINGS

FIGS. 3A and 3B are diagrams to show examples of how shortened TTIs are configured;

FIGS. 5A and 5B are diagrams to show examples of cases where activation/deactivation is allowed based on the TTI of the cell to be activated/deactivated;

FIGS. 6A and 6B are diagrams to show examples of cases where activation/deactivation is allowed based on the TTI of the cell in which the activation/deactivation command is received;

FIGS. 7A and 7B are diagrams to show other examples of cases where activation/deactivation is allowed based on the TTI of the cell in which the activation/deactivation command is received;

DESCRIPTION OF EMBODIMENTS

Figure 1:
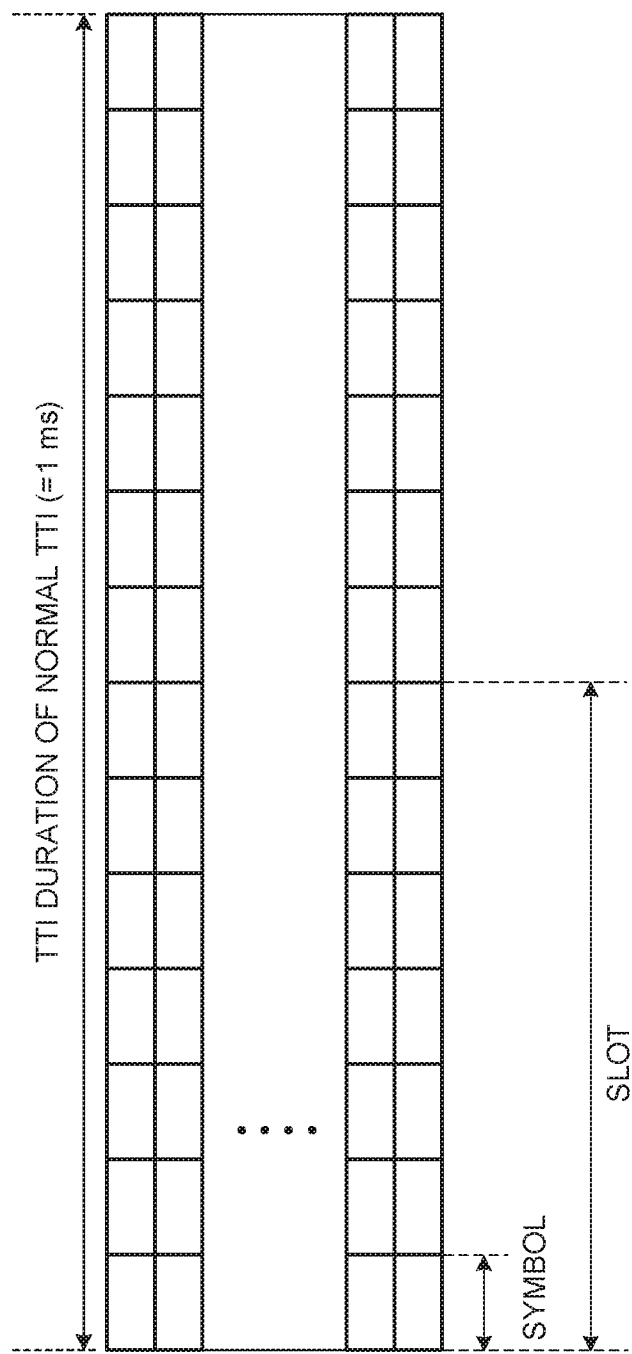
FIG. 1 is a diagram to show examples of transmission time intervals (TTIs) in existing LTE systems (Rel. 8 to 12)

FIG. 1 is a diagram to explain an example of transmission time intervals (TTIs) in existing systems (LTE Rel. 8 to 12). As shown in FIG. 1, a TTI in LTE Rel. 8 to 12 (hereinafter referred to as a "normal TTI") has a time duration of one ms.

A normal TTI is also referred to as a "subframe," and is comprised of two time slots. A TTI is one channel-coded data packet (transport block) transmission time unit, and is the processing unit in scheduling, link adaptation, etc.

As shown in FIG. 1, when a normal cyclic prefix (CP) is used in the downlink (DL), a normal TTI includes 14 OFDM (Orthogonal Frequency Division Multiplexing) symbols (seven OFDM symbols per slot). Each OFDM symbol has a time duration (symbol duration) of 66.7 μs, and a normal CP of 4.76 μs is appended. Since the symbol duration and the subcarrier period are in reciprocal relationship to each other, the subcarrier period is 15 kHz when the symbol duration 66.7 μs.

Also, when normal a cyclic prefix (CP) is used in the uplink (UL), a normal TTI is configured to include 14 SC-FDMA (Single Carrier Frequency Division Multiple Access) symbols (seven SC-FDMA symbols per slot). Each SC-FDMA symbol has a time duration (symbol duration) of 66.7 μs, and a normal CP of 4.76 μs is appended. Since the symbol duration and the subcarrier period are in reciprocal relationship to each other, the subcarrier period is 15 kHz when the symbol duration 66.7 μs.

Incidentally, when extended CPs are used, a normal TTI may include 12 OFDM symbols (or 12 SC-FDMA symbols). In this case, each OFDM symbol (or each SC-FDMA symbol) has a time duration of 66.7 μs, and an extended CP of 16.67 μs is appended.

On the other hand, in future radio communication systems such as Rel. 13 and later LTE and 5G, a radio interface that is suitable for high frequency bands such as several tens of GHz or the like and a radio interface that minimizes delay for IoT (Internet of Things), MTC (Machine Type Communication), M2M (Machine To Machine), D2D (Device To Device) and V2V (Vehicular To Vehicular) services are in demand.

Figure 2:
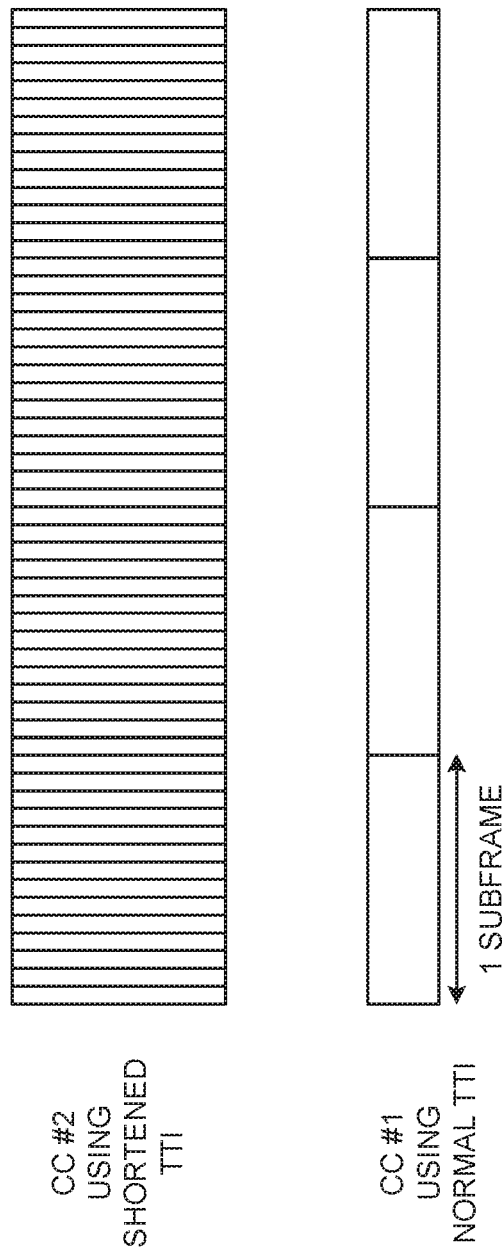
FIG. 2 is a diagram to explain a normal TTI and a shortened TTI.

So, in future communication systems, communication may be performed using shortened TTIs, which are TTIs shorter than 1 ms (see FIG. 2). FIG. 2 shows a cell (CC #1) using normal TTIs (one ms) and a cell (CC #2) using shortened TTIs. Also, when shortened TTIs are used, it may be possible to change the subcarrier spacing (for example, expand the subcarrier spacing) from that of subcarriers with normal TTIs.

When TTIs of a shorter time duration than normal TTIs (hereinafter referred to as "shortened TTIs") are used, the time margin for processing in user terminals and radio base stations (for example, coding, decoding, etc.) increases, so that the processing latency can be reduced. Also, when shortened TTIs are used, it is possible to increase the number of user terminals that can be accommodated per unit time (for example, 1 ms). Below, the configuration of shortened TTIs and so on will be explained.

(Example of Configuration of Shortened TTIs)

A configuration example of shortened TTIs will be described with reference to FIGS. 3A and 3B. As shown in FIGS. 3A and 3B, shortened TTIs have a time duration (TTI duration) shorter than one ms. A shortened TTI may be one TTI duration or multiple TTI durations, whose multiples become 0.5 ms, 0.25 ms, 0.2 ms, 0.1 ms and so on. Alternatively, when normal CPs are used, given that a normal TTI contains fourteen symbols, one TTI duration or multiple TTI durations, whose multiples are integral multiples of 1/14 ms, such as 7/14 ms, 4/14 ms, 3/14 ms, 2/14 ms, and 1/14 ms, may be used. Also, when extended CPs are used, given that a normal TTI contains twelve symbols, one TTI duration or multiple TTI durations, whose multiples are integral multiples of 1/12 ms, such as 6/12 ms, 4/12 ms, 3/12 ms, 2/12 ms and 1/12 ms, may be used.

Also in shortened TTIs, as in conventional LTE, whether to use a normal CP or use an extended CP can be configured by way of higher layer signaling such as broadcast information and RRC signaling. By this means, it is possible to introduce shortened TTIs, while maintaining compatibility (synchronization) with 1-ms normal TTIs.

Note that, although FIGS. 3A and 3B illustrate example cases of using normal CPs, the present invention is not limited to these. Shortened TTIs have only to have a shorter time duration than normal TTIs, and the number of symbols in a shortened TTI, the duration of symbols, the duration of CPs and suchlike configurations are not critical. Also, although examples will be described below in which OFDM symbols are used in the DL and SC-FDMA symbols are used in the UL, the present invention is not limited to these.

FIG. 3A is a diagram to show a first configuration example of shortened TTIs. As shown in FIG. 3A, in the first configuration example, a shortened TTI is comprised of 14 OFDM symbols (or SC-FDMA symbols), which is equal in number to a normal TTI, and each OFDM symbol (each SC-FDMA symbol) has a symbol duration shorter than the symbol duration (=66.7 μs) of the normal TTI.

As shown in FIG. 3A, when maintaining the number of symbols in a normal TTI and shortening the symbol duration, the physical layer signal configuration (arrangement of REs, etc.) of normal TTIs can be reused. In addition, when maintaining the number of symbols in a normal TTI, it is possible to include, in a shortened TTI, the same amount of information (the same amount of bits) as in the normal TTI. Meanwhile, given that the time duration of symbols in shortened TTIs is different from that of symbols in normal TTIs, it is difficult to frequency-multiplex the shortened TTI-signal shown in FIG. 3A with a normal-TTI signal, in the same system band (or cell, CC, etc.).

Also, since the symbol duration and the subcarrier period are each the reciprocal of the other, as shown in FIG. 3A, when shortening the symbol duration, the subcarrier period is wider than the 15-kHz subcarrier period of normal TTIs. When the subcarrier spacing becomes wider, it is possible to effectively prevent the inter-channel interference that is caused by the Doppler shift when the user terminal moves, and the deterioration of communication quality due to phase noise in the user terminal's receiver. In particular, in high frequency bands such as bands of several tens of GHz, the deterioration of communication quality can be effectively prevented by expanding the subcarrier spacing.

FIG. 3B is a diagram to show a second configuration example of a shortened TTI. As shown in FIG. 3B, according to the second configuration example, a shortened TTI is comprised of a smaller number of OFDM symbols (or SC-FDMA symbols) than a normal TTI, and each OFDM symbol (each SC-FDMA symbol) has the same symbol duration (=66.7 μs) as a normal TTI. In this case, the shortened TTI can be formed with symbol units of a normal TTI (that is, can be formed with a reduced number of symbols). For example, a shortened TTI can be formed by using part of the fourteen symbols included in one subframe. In FIG. 3B, a shortened TTI is comprised of seven OFDM symbols (SC-FDMA symbols), which is half of a normal TTI.

As shown in FIG. 3B, when reducing the symbol duration and reducing number of symbols, the amount of information (the amount of bits) included in a shortened TTI can be reduced lower than in a normal TTI. Therefore, the user terminal can perform the receiving process (for example, demodulation, decoding, etc.) of the information included in a shortened TTI in a shorter time than a normal TTI, and therefore the processing latency can be shortened. Also, since the shortened-TTI signal shown in FIG. 3B and a normal-TTI signal can be frequency-multiplexed within the same system band (or the cell, the CC, etc.), compatibility with normal TTIs can be maintained.

(Example of Configuration of Shortened TTI)

Figure 4A:
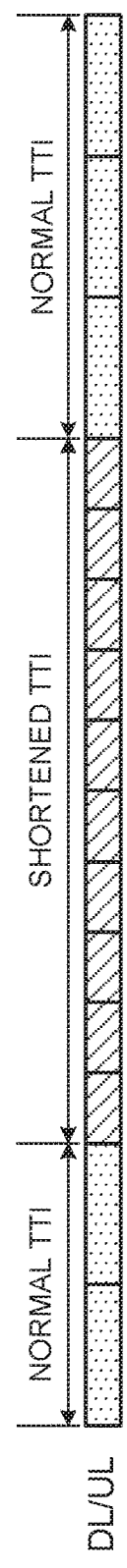
FIGS. 4A, 4B, and 4C are diagrams to show examples of how normal TTIs and shortened TTIs are configured.
Figure 4B:
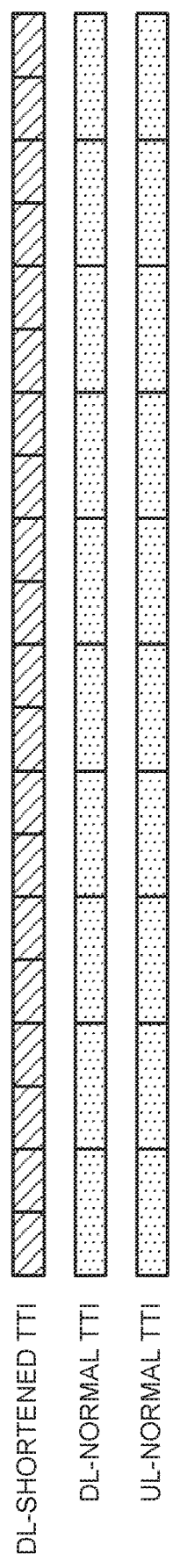
Figure 4C:
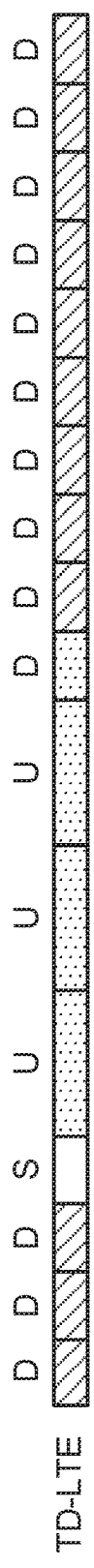

An example of the configuration of shortened TTIs will be described. When shortened TTIs are used, it is also possible to configure both normal TTIs and shortened TTIs in a user terminal so as to reserve compatibility with existing systems (LTE Rel. 8 to 12). FIGS. 4A, 4B, and 4C show examples of the configuration of normal TTIs and shortened TTIs. Note that FIGS. 4A, 4B, and 4C are merely examples, and these are by no means limiting.

FIG. 4A is a diagram to show an example of the first configuration of shortened TTIs. As shown in FIG. 4A, normal TTIs and shortened TTIs may coexist in time in the same component carrier (CC) (frequency domain). To be more specific, a shortened TTI may be configured in a specific subframe (or a specific radio frame) of the same CC. For example, in FIG. 4A, shortened TTIs are configured in five consecutive subframes in the same CC, and normal TTIs are configured in the other subframes. The specific subframes may be, for example, subframes that can be configured as MBSFN subframes, or subframes that include (or do not include) specific signals such as the MIB or synchronization channels. The number and positions of subframes where shortened TTIs are configured are not limited to those shown in FIG. 4A.

FIG. 4B is a diagram to show an example of a second configuration of shortened TTIs. Carrier aggregation (CA) or dual connectivity (DC) may be performed by integrating CCs with normal TTIs and CCs with shortened TTIs, as shown in FIG. 4B. To be more specific, shortened TTIs may be configured in specific CCs (to be more specific, in the DL and/or the UL of specific CCs). For example, in FIG. 4B, shortened TTIs are configured in the DL of a particular CC and normal TTIs are configured in the DL and UL of another CC. Note that the number and locations of CCs where shortened TTIs are configured are not limited to those shown in FIG. 4B.

Also, in the event of CA, shortened TTIs may also be configured in a specific CC (the primary (P) cell and/or a secondary (S) cell) of the same radio base station. On the other hand, in the event of DC, shortened TTIs may be configured in specific CCs (P cell and/or S cells) in the master cell group (MCG) formed by the first radio base station, or shortened TTIs may be configured in specific CCs (primary secondary (PS) cells and/or S cells) in a secondary cell group (SCG) formed by a second radio base station.

FIG. 4C is a diagram to show an example of a third configuration of shortened TTIs. As shown in FIG. 4C, shortened TTIs may be configured in either the DL or the UL. For example, in FIG. 4C, a case is shown in which, in a TDD system, normal TTIs are configured in the UL and shortened TTIs are configured in the DL.

Also, specific DL or UL channels or signals may be allocated (configured) in shortened TTIs. For example, an uplink control channel (PUCCH: Physical Uplink Control Channel) may be allocated to normal TTIs, and an uplink shared channel (PUSCH: Physical Uplink Shared Channel) may be allocated to shortened TTIs. In this case, for example, the user terminal transmits the PUCCH in normal TTIs and transmits the PUSCH in shortened TTIs.

Also, a multiple-access scheme that is different from OFDM (or SC-FDMA), which is the multiple-access scheme in LTE Rels. 8 to 12, may be assigned (configured) in shortened TTIs.

Now, in order to use frequencies effectively in 5G radio communication, it may be possible to run multiple services with different numerologies (for example, with different TTI durations applied) in the same carrier. For example, it may be possible to run a new RAT carrier (frequency, cell, CC, etc.) by accommodating user terminals (for example, user terminals that use MBB, IoT, URLLC, etc.) that communicate based on different numerologies, within the same time frame.

By contrast with this, in existing LTE systems, timing control in communication is carried out in units of subframes (1 ms), but how to control communication when communication is carried out by introducing shortened TTI is still a challenge.

For example, in CA for existing LTE systems, activation/deactivation of SCells is stipulated. A user terminal activates/deactivates SCells based on a command from a radio base station, or based on a predetermined timer. Even when an SCell is activated, the SCell may be deactivated again depending on the communication environment and so on, so that the power consumption of the user terminal can be reduced.

When activation of an SCell is commanded, the user terminal will perform the following control on the SCell. Note that the user terminal performs following operations (A1) to (A7) in response to an activation command provided from the network (for example, a radio base station) in the MAC layer. An activation command may be referred to as a "starting operation command," a "configuration command," and so on.

(A1) SRS transmission in the SCell;
(A2) CQI/PMI/RI/PTI reporting to the SCell;
(A3) PDCCH monitoring in the SCell;
(A4) PDCCH monitoring for the SCell;
(A5) PUCCH transmission in the SCell;
(A6) Starting or restarting of a deactivation timer in the SCell; and
(A7) PHR triggering.

Upon receiving an activation command, 8 ms after the subframe in which this activation command is received, the user terminal starts reporting the CSI of the SCell, and starts the deactivation timer (SCell deactivation timer). The deactivation timer may be also referred to as a "deconfiguration timer" and so on. Also, the user terminal exerts control so that the activation of the SCell is complete within a predetermined time (for example, in 24 ms or 34 ms). Completion of activation means starting above operations (A1) to (A7).

On the other hand, when deactivation of an SCell is commanded, the user terminal will perform the following control on the SCell. Note that the user terminal performs following operations (B1) to (B7) in response to a deactivation command provided from the network (for example, a radio base station) in the MAC layer, or upon expiration of a deactivation timer (SCell deactivation timer). A deactivation command may be referred to as a "deactivation operation command," a "deconfiguration command" and so on. The deactivation timer may be also referred to as a "deconfiguration timer" and so on.

(B1) Not transmitting an SRS/UL-SCH/RACH in the SCell;
(B2) Not reporting a CQI/PMI/RI/PTI to the SCell;
(B3) Not monitoring the PDCCH in the SCell;
(B4) Not monitor the PDCCH for the SCell;
(B5) Not transmitting the PUCCH in the SCell;
(B6) Stopping the SCell's deactivation timer; and
(B7) Emptying the HARQ buffer corresponding to the SCell.

Upon receiving a deactivation command, 8 ms after the subframe in which this deactivation command is received, the user terminal stops reporting the SCell's CSI. Also, the user terminal exerts control so that deactivation of the SCell is complete within a predetermined time (for example, in 24 ms or 34 ms). Completion of deactivation means finishing above operations (B1) to (B7).

As described above, in CA for existing LTE systems, the operation period (latency time) of SCell activation/deactivation is determined in units of normal subframes (1 ms). Meanwhile, when shortened TTIs are introduced as mentioned earlier, how to control the operation period of activation/deactivation becomes a challenge. For example, in the event a plurality of cells with varying TTI durations are configured, the problem is what kind of control should be applied if the TTI duration in a predetermined cell that is to be activated and/or deactivated and the TTI duration in another cell where an activation command and/or a deactivation command directed to the predetermined cell is transmitted are different.

So, the present inventors have focused on the fact that signals are transmitted and received in shortened TTIs (for example, less than 1 ms) in cells where shortened TTIs are used, and come up with the idea of controlling the operation period for activating and/or deactivating a predetermined cell (for example, an SCell) based on the TTI duration applied in the predetermined cell to be activated and/or deactivated. Also, it is possible to control the operation period for activating and/or deactivating a predetermined cell based on the cycle of decoding a DL channel (for example, a downlink control channel) in the predetermined cell.

In addition, the present inventors noted that the cell where an activation command and/or a deactivation command for reporting activation and/or deactivation of a predetermined cell is transmitted may differ from the predetermined cell itself, and come up with the idea of controlling the activation period and/or deactivation operation period of the predetermined cell based on the TTI duration of the cell where the activation command and/or the deactivation command are actually transmitted. Also, the present inventors have found out that the activation period and/or deactivation operation period of the predetermined cell may be controlled based on the cycle of decoding a DL channel (for example, a downlink control channel) in the cell where the activation command and/or the deactivation command are transmitted.

Furthermore, the present inventors have come up with the idea of configuring the operation period for activating and/or deactivating a predetermined cell where shortened TTIs are used to a predetermined value (for example, the same value as for normal TTIs) regardless of the TTI duration in the predetermined cell to be activated.

Now, the present embodiment will be described below detail. Although, in the following description, a TTI having a shorter TTI duration than 1 ms will be referred to as a "shortened TTI," this may be also referred to as a "short TTI," a "shortened subframe," or a "short subframe." Also, a 1-ms TTI will be referred to as a "normal TTI," but this may be also referred to as a "long TTI," a "normal subframe," or a "long subframe." Also, the shortened TTI of the present embodiment can adopt the configuration shown in FIG. 1 to FIG. 4 above.

Furthermore, the present embodiment can be applied to user terminals that are at least capable of communicating using shortened TTIs, or to user terminals that can communicate using a plurality of cells having varying TTI durations. Furthermore, although LTE systems will be exemplified in the following description, the present embodiment is not limited to this, and any system that uses multiple TTIs is applicable. In addition, a plurality of embodiments described below may be implemented individually or in combination as appropriate.

(First Aspect)

In accordance with a first aspect of the present invention, a case will be described here in which the operation period (latency time) of activation and/or deactivation of a predetermined cell where a shortened TTI is configured is configured short (that is, configured to a small value) compared to when a shortened TTI is not configured.

FIG. 5A shows an example of activating a predetermined cell in which a shortened TTI is configured. FIG. 5A shows a case where an activation command to command activation of a predetermined cell (for example, an SCell) in which a shortened TTI is configured is reported to a user terminal via another cell (for example, a cell in which a normal TTI is configured). Note that this another cell may be a cell in which the same shortened TTI as that configured in the predetermined cell is configured, or may be a cell in which the TTI duration is configured shorter than in the predetermined cell.

When the user terminal receives the activation command for the predetermined cell in which a shortened TTI is configured, the user terminal starts reporting the CSI of the predetermined cell and/or starts a deactivation timer (SCell deactivation timer) a predetermined period of time (for example, $X_1$ ms) after the timing of receipt. Also, the user terminal exerts control so that activation of the predetermined cell is complete within a predetermined time (for example, in $Y_1$ ms or in $Z_1$ ms) from the timing the activation command is received (or $X_1$ ms after that).

At least one of $X_1$, $Y_1$ and $Z_1$ can be a value that is determined based on the TTI duration (or the number of symbols) of the shortened TTI, or based on the cycle in which a downlink control channel is decoded in shortened TTIs. To be more specific, in the operation of activating the predetermined cell in which a shortened TTI is configured, at least one of $X_1$, $Y_1$ and $Z_1$ can be made a value that fulfills $X_1<8$, $Y_1<24$ and $Z_1<34$ (where $X_1$, $Y_1$ and $Z_1 \geq 0$). In other words, when a shortened TTI is configured in a predetermined cell, the operation period (for example, $X_1$, $Y_1$ and $Z_1$) for its activation is configured shorter than the operation period for when a normal TTI is configured.

For example, when the TTI of the predetermined cell is a short TTI of seven symbols, or when the cycle of decoding a downlink control channel in shortened TTIs in the predetermined cell is seven symbols, $X_1=4$, $Y_1=12$ and $Z_1=17$ can be set. Alternatively, part of $X_1$, $Y_1$ and $Z_1$ may be made the same value as when a normal TTI is configured (for example, $X_1=8$), and the rest of the values may be configured based on the TTI duration in the predetermined cell (for example, $Y_1=12$ and $Z_1=17$ may be configured).

The radio base station may report information about part or all of $X_1$, $Y_1$ and $Z_1$ (for example, the relationship between the TTI duration and $X_1$, $Y_1$ and $Z_1$) to the user terminal using higher layer signaling, MAC layer signaling, physical layer signaling (DCI) and so on. Alternatively, based on the TTI duration of the shortened TTI configured in the predetermined cell, or based on the cycle in which a downlink control channel is decoded in shortened TTIs, the user terminal may determine part or all of $X_1$, $Y_1$ and $Z_1$ implicitly. Alternatively, the relationship between the TTI duration and $X_1$, $Y_1$ and $Z_1$ may be determined in advance in the specification.

Also, the user terminal transmits CQI index 0 (OOR: Out Of Range) as a CSI report, during the time from $X_1$ ms later to completion of the activation of the predetermined cell.

According to the first aspect, the operation period of activation (for example, $X_1$, $Y_1$ and $Z_1$) is determined based on the TTI duration of the cell that is to be activated, regardless of the TTI duration of the cell in which the activation command is received. Thus, when a shortened TTI is configured in a predetermined cell, the time required for activation can be made shorter than when a normal TTI is configured, so that the user's perceived speed can be improved.

FIG. 5B shows an example of deactivating a predetermined cell in which a shortened TTI is configured. FIG. 5B shows a case where a deactivation command to command deactivation of a predetermined cell (for example, an SCell) in which a shortened TTI is configured is reported to the user terminal via another cell (for example, a cell in which a normal TTI is configured). Note that this another cell may be a cell in which the same shortened TTI as that of the predetermined cell is configured, or may be a cell in which a TTI duration that is shorter than that of the predetermined cell is configured. Obviously, a configuration may be adopted here in which the deactivation command is reported to the user terminal in the predetermined cell to be deactivated.

When the user terminal receives the deactivation command for the predetermined cell in which a shortened TTI is configured, the user terminal stops reporting the CSI of the predetermined cell after a predetermined period (for example, $X_2$ ms) from the timing of receipt. Also, the user terminal exerts control so that deactivation of the predetermined cell is complete within a predetermined time (for example, in $Y_2$ ms or in $Z_2$ ms) from the timing the deactivation command is received (or $X_2$ ms after that).

At least one of $X_2$, $Y_2$ and $Z_2$ can be a value that is determined based on the TTI duration (or the number of symbols) of the shortened TTI, or based on the cycle in which a downlink control channel is decoded in shortened TTIs. To be more specific, in the operation of deactivating the predetermined cell in which a shortened TTI is configured, at least one of $X_2$, $Y_2$ and $Z_2$ can be made a value that fulfills $X_2<8$, $Y_2<24$ and $Z_2<34$ (where $X_2$, $Y_2$ and $Z_2 \geq 0$).

For example, when the TTI of the predetermined cell is a short TTI of seven symbols, or when the cycle of decoding a downlink control channel in shortened TTIs in the predetermined cell is seven symbols, $X_2=4$, $Y_2=12$ and $Z_2=17$ can be set. Alternately, part of $X_2$, $Y_2$ and $Z_2$ may be made the same value as when a normal TTI is configured (for example, $X_2=8$), and the rest of the values may be configured based on the TTI duration in the predetermined cell (for example, $Y_2=12$ and $Z_2=17$ may be configured). Note that all or part of above $X_1$ and $X_2$, $Y_1$ and $Y_2$ and $Z_1$ and $Z_2$ may be configured to the same values, or configured to different values.

The radio base station may report information about part or all of $X_2$, $Y_2$ and $Z_2$ (for example, the relationship between the TTI duration and $X_2$, $Y_2$ and $Z_2$) to the user terminal using higher layer signaling, MAC layer signaling, physical layer signaling (DCI) and so on. Alternatively, based on the TTI duration of the shortened TTI configured in the predetermined cell, or based on the cycle in which a downlink control channel is decoded in shortened TTIs, the user terminal may determine part or all of $X_2$, $Y_2$ and $Z_2$ implicitly. Alternatively, the relationship between the TTI duration and $X_2$, $Y_2$ and $Z_2$ may be determined in advance in the specification.

According to the first aspect, the operation period of deactivation (for example, $X_2$, $Y_2$ and $Z_2$) is determined based on the TTI duration of the cell that is to be deactivated, regardless of the TTI duration of the cell in which the deactivation command is received. Thus, when a shortened TTI is configured in a predetermined cell, the time required for deactivation can be made shorter than when a normal TTI is configured. As a result of this, the predetermined cell is deactivated quickly and the report of CQI index 0 is stopped early, so that the efficiency of the use of radio resources in the cell can be improved.

Also, although FIG. 5B shows a case where deactivation is performed in response to a deactivation command, the present embodiment is not limited to this. The deactivation operation may be controlled based on the expiration of a deactivation timer, not a deactivation command. In this case, too, $X_2$, $Y_2$ and $Z_2$ can be configured as when the deactivation operation is controlled based on a deactivation command.

(Second Aspect)

In accordance with a second aspect of the present invention, a case will be described here in which the operation period (latency time) of activation and/or deactivation is controlled based on the TTI duration of the cell in which an activation command and/or a deactivation command directed to a predetermined cell where a shortened TTI is configured are received.

<When Command is Received in Cell Where Shortened TTI is Not Configured>

FIG. 6A shows an example of activating a predetermined cell where a shortened TTI is configured. In the case illustrated in FIG. 6A, an activation command to command activation of a predetermined cell (here, SCell #1), in which a shortened TTI is configured, is reported to a user terminal via another cell (for example, a cell in which a shortened TTI is configured). FIGS. 6A and 6B show cases where a normal TTI is configured in another cell where an activation command/deactivation command is transmitted.

When the user terminal receives an activation command directed to a predetermined cell, in which a shortened TTI is configured, in another cell, the user terminal starts reporting the CSI of the predetermined cell and/or starts a deactivation timer $X_0$ (for example, $X_0$=8 ms) after the timing of receipt. Also, the user terminal exerts control so that activation of the predetermined cell is complete within a predetermined time (in $Y_0$ (for example, $Y_0$=24 ms) or in $Z_0$ (for example, $Z_0$=34 ms)) from the timing the activation command is received.

Also, the user terminal transmits CQI index 0 (OOR) as a CSI report, during the time from 8 ms later to completion of the activation of the predetermined cell.

As described above, in FIG. 6A, activation is controlled by configuring the operation period in the same way as in existing LTE systems, based on the TTI duration (normal TTI) of another cell where the activation command for a predetermined cell is transmitted, instead of the shortened TTI in the predetermined cell that is to be activated. In this case, the user terminal may perform the activation process with a latency time to match the TTI duration in another cell where the activation command is received, so that the processing load on the user terminal can be reduced.

FIG. 6B shows an example of deactivating a predetermined cell in which a shortened TTI is configured. FIG. 6B shows a case where a deactivation command to command deactivation of a predetermined cell (for example, SCell #1) in which a shortened TTI is configured is reported to the user terminal via another cell (for example, a cell in which a normal TTI is configured).

When the user terminal receives the deactivation command for the predetermined cell in which a shortened TTI is configured in another cell, the user terminal stops reporting the CSI of the predetermined cell $X_0$ (for example, $X_0$=8 ms) after the timing of receipt. Also, the user terminal exerts control so that deactivation of the predetermined cell is complete within a predetermined time (in $Y_0$ (for example, $Y_0$=24 ms) or in $Z_0$ (for example, $Z_0$=34 ms)) from the timing the deactivation command is received.

As described above, in FIG. 6B, deactivation is controlled by configuring the operation period in the same way as in existing LTE systems, based on the TTI duration (normal TTI) of another cell where the deactivation command for a predetermined cell is transmitted, instead of the shortened TTI in the predetermined cell that is to be deactivated. In this case, the user terminal may perform the deactivation process with a latency time to match the TTI duration in another cell where the deactivation command is received, so that the processing load on the user terminal can be reduced.

<When Command is Received in Cell Where Shortened TTI is Configured>

FIG. 7A shows a case where an activation command to command activation of a predetermined cell (here, SCell #1), in which a shortened TTI is configured, is reported to a user terminal via another cell (for example, SCell #2 in which a shortened TTI is configured). FIGS. 7A and 7B show cases where a shortened TTI having the same TTI duration as that of a predetermined cell is configured in another cell where an activation command/deactivation command is transmitted.

When the user terminal receives an activation command directed to a predetermined cell, in which a shortened TTI is configured, in another cell (SCell #2), the user terminal starts reporting the CSI of the predetermined cell and/or starts a deactivation timer a predetermined period of time (for example, $X_1$ ms) after the timing of receipt. Also, the user terminal exerts control so that activation of the predetermined cell is complete within a predetermined time (for example, in $Y_1$ ms or in $Z_1$ ms) from the timing the activation command is received (or $X_1$ ms after that).

At least one of $X_1$, $Y_1$ and $Z_1$ can be a value that is determined based on the TTI duration (or the number of symbols) of the shortened TTI configured in another cell, or based on the cycle in which a downlink control channel is decoded in shortened TTIs. To be more specific, in the operation of activating the predetermined cell, at least one of $X_1$, $Y_1$, and $Z_1$ can be made a value that fulfills $X_1$<8, $Y_1$<24 and $Z_1$<34 (where $X_1$, $Y_1$ and $Z_1 \geq 0$).

For example, when the TTI of another cell is a short TTI of seven symbols, or when the cycle of decoding a downlink control channel in shortened TTIs in another cell is seven symbols, $X_1$=4, $Y_1$=12 and $Z_1$=17 can be set. Alternatively, part of $X_1$, $Y_1$ and $Z_1$ may be made the same value as when a normal TTI is configured (for example, $X_1$=8), and the rest of the values may be configured based on the TTI duration in another cell (for example, $Y_1$=12 and $Z_1$=17 may be configured).

The radio base station may report information about part or all of $X_1$, $Y_1$ and $Z_1$ (for example, the relationship between the TTI duration and $X_1$, $Y_1$ and $Z_1$) to the user terminal using higher layer signaling, MAC layer signaling, physical layer signaling (DCI) and so on. Alternatively, based on the TTI duration of the shortened TTI configured in the predetermined cell, or based on the cycle in which a downlink control channel is decoded in shortened TTIs, the user terminal may determine part or all of $X_1$, $Y_1$ and $Z_1$ implicitly. Alternatively, the relationship between the TTI duration and $X_1$, $Y_1$ and $Z_1$ may be determined in advance in the specification.

The user terminal transmits CQI index 0 (OOR: Out Of Range) as a CSI report, during the time from $X_1$ ms later to completion of the activation of the predetermined cell.

In FIG. 7A, the operation period of activation (for example, $X_1$, $Y_1$ and $Z_1$) is determined based on the TTI duration of the cell where the activation command is received, regardless of the TTI duration of the predetermined cell that is to be activated. In this case, the user terminal may perform the activation process with a latency time to match the TTI duration in another cell where the activation command is received, so that the processing load on the user terminal can be reduced. Thus, when a shortened TTI is configured in another cell, the time required for activation can be made shorter than when a normal TTI is configured, so that the user's perceived speed can be improved.

FIG. 7B shows a case where a deactivation command to command deactivation of a predetermined cell (here, SCell #1) in which a shortened TTI is configured is reported to the user terminal via another cell (here, SCell #2 in which a shortened TTI is configured).

When the user terminal receives the deactivation command for the predetermined cell, in which a shortened TTI is configured, in another cell, the user terminal stops reporting the CSI of the predetermined cell after a predetermined period (for example, $X_2$ ms) from the timing of receipt. Also, the user terminal exerts control so that deactivation of the predetermined cell is complete within a predetermined time (for example, in $Y_2$ ms or in $Z_2$ ms) from the timing the deactivation command is received (or $X_2$ ms after that).

At least one of $X_2$, $Y_2$ and $Z_2$ can be a value that is determined based on the TTI duration (or the number of symbols) of the shortened TTI configured in another cell, or based on the cycle in which a downlink control channel is decoded in shortened TTIs. To be more specific, in the operation of activating the predetermined cell, at least one of $X_2$, $Y_2$, and $Z_2$ can be made a value that fulfills $X_2<8$, $Y_2<24$, and $Z_2<34$ (where $X_2$, $Y_2$ and $Z_2 \geq 0$).

For example, when the TTI of another cell is a short TTI of seven symbols, or when the cycle of decoding a downlink control channel in shortened TTIs in another cell is seven symbols, $X_2=4$, $Y_2=12$ and $Z_2=17$ can be set. Alternately, part of $X_2$, $Y_2$ and $Z_2$ may be made the same value as when a normal TTI is configured (for example, $X_2=8$), and the rest of the values may be configured based on the TTI duration in another cell (for example, $Y_2=12$ and $Z_2=17$ may be configured). Note that all or part of above $X_1$ and $X_2$, $Y_1$ and $Y_2$ and $Z_1$ and $Z_2$ may be configured to the same values, or configured to different values.

The radio base station may report information about part or all of $X_2$, $Y_2$ and $Z_2$ (for example, the relationship between the TTI duration and $X_2$, $Y_2$ and $Z_2$) to the user terminal using higher layer signaling, MAC layer signaling, physical layer signaling (DCI) and so on. Alternatively, based on the TTI duration of the shortened TTI configured in the predetermined cell, or based on the cycle in which a downlink control channel is decoded in shortened TTIs, the user terminal may determine part or all of $X_2$, $Y_2$ and $Z_2$ implicitly. Alternatively, the relationship between the TTI duration and $X_2$, $Y_2$ and $Z_2$ may be determined in advance in the specification.

In FIG. 7B, the operation period of deactivation (for example, $X_2$, $Y_2$ and $Z_2$) is determined based on the TTI duration of the cell where the deactivation command is received, regardless of the TTI duration of a predetermined cell that is to be deactivated. In this case, the user terminal may perform the deactivation process with a latency time to match the TTI duration in another cell where the deactivation command is received, so that the processing load on the user terminal can be reduced. Thus, when a shortened TTI is configured in another cell, the time required for deactivation can be made shorter than when a normal TTI is configured. As a result of this, the predetermined cell is deactivated quickly and the report of CQI index 0 is stopped early, so that the efficiency of the use of radio resources in the cell can be improved.

Note that another cell may be a cell in which a shortened TTI having a different TTI duration from that of the predetermined cell is configured. In this case, the user terminal can control the operation period for activation and/or deactivation based on the TTI duration configured in another cell. Also, the operation periods (X, Y and Z) of activation and/or deactivation for shortened TTIs of varying TTI durations may be configured in common.

Also, although cases have been illustrated with FIG. 6B and FIG. 7B where deactivation is performed in response to a deactivation command, the present embodiment is by no means limited to this. The deactivation operation may be controlled based on the expiration of a deactivation timer, not a deactivation command.

(Variations)

Cases have been shown above with FIG. 6A and FIG. 7A where the operation period (latency time) of activation is controlled based on the TTI duration of the cell in which the activation command is received, and cases have been shown above with FIG. 6B and FIG. 7B where the operation period of deactivation is controlled based on the TTI duration of the cell in which the deactivation command is received, the present embodiment is not limited to these.

The user terminal may control the operation period for activation and/or deactivation (for example, $X_1$, $Y_1$ and $Z_1$, and/or $X_2$, $Y_2$ and $Z_2$) based on the TTI duration in the channel where the activation command and/or the deactivation command are received (for example, a downlink shared channel).

For example, if the user terminal receives an activation command directed to a predetermined cell, in which a shortened TTI is configured, in an existing PDSCH (for example, a normal PDSCH in another cell), the user terminal can control activation in the way described above with reference to FIG. 6A. Also, when the user terminal receives a deactivation command directed to the predetermined cell in an existing PDSCH (for example, a normal PDSCH in another cell), the user terminal can control deactivation in the way described above with reference to FIG. 6B.

When the user terminal receives an activation command directed to a predetermined cell in which a shortened TTI configured in a shortened PDSCH (for example, an sPDSCH of another cell), the user terminal can control activation in the way described above with reference to FIG. 7A. Also, when the user terminal receives a deactivation command directed to a predetermined cell in which a shortened TTI is configured in a shortened PDSCH (for example, an sPDSCH of another cell, or an sPDSCH of a predetermined cell), the user terminal can control deactivation in the way described above with reference to FIG. 7B.

In this way, the user terminal may control the operation period for activation and/or deactivation based on the TTI duration in the channel where the activation command and/or the deactivation command are actually transmitted. In this way, when the TTI duration changes dynamically in the cell (another cell) where the command is transmitted (see, for example, FIG. 4A above), or when different TTI durations are configured depending on channels, the operation period for activation and/or deactivation can be configured appropriately. For example, if, during the period in which a shortened TTI is configured in another cell, an activation command and/or a deactivation command are received in this another cell, the operation period for activation and/or deactivation can be configured shorter than when a normal TTI is configured, based on the TTI duration of the shortened TTI.

(Third Aspect)

In accordance with a third aspect of the present invention, a case will be described here in which the operation period for activating and/or deactivating a predetermined cell, in which a shortened TTI is configured, is made the same value as when a normal TTI is configured.

Figure 8A:
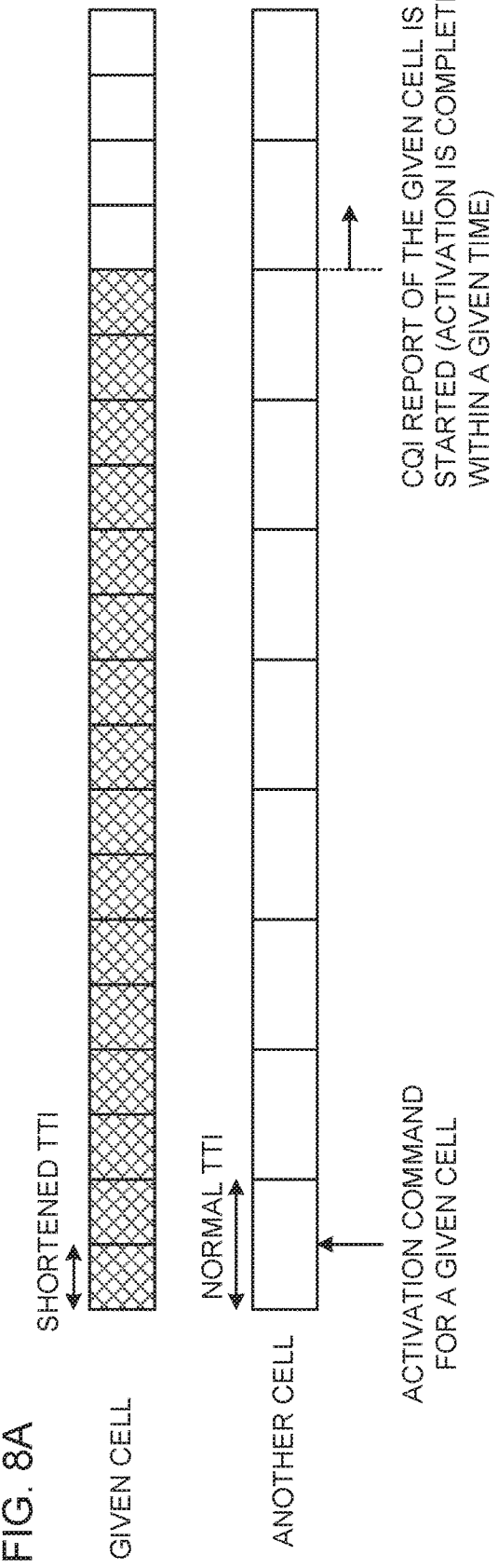
FIGS. 8A and 8B are diagrams to show examples of cases where activation/deactivation is allowed regardless of the TTI of the cell to be activated/deactivated.

FIG. 8A shows an example of activating a predetermined cell in which a shortened TTI is configured. FIG. 8A shows a case where an activation command to command activation of a predetermined cell (for example, an SCell) in which a shortened TTI is configured is reported to a user terminal via another cell (for example, a cell in which a normal TTI is configured). Note that this another cell may be a cell in which the same shortened TTI as that configured in the predetermined cell is configured, or may be a cell in which the TTI duration is configured shorter than in the predetermined cell.

When the user terminal receives the activation command for the predetermined cell in which a shortened TTI is configured, the user terminal starts reporting the CSI of the predetermined cell and/or starts a deactivation timer $X_0$ after the timing of receipt (for example, $X_0$=8 ms). Also, the user terminal exerts control so that activation of the predetermined cell is complete within a predetermined time (in $Y_0$ (for example, $Y_0$=24 ms) or in $Z_0$ (for example, $Z_0$=34 ms)) from the timing the activation command is received.

The user terminal transmits CQI index 0 (OOR) as a CSI report, during the time from 8 ms later to completion of the activation of the predetermined cell.

Thus, in the case illustrated in FIG. 8A, the operation period of activation is controlled regardless of the TTI duration configured in a predetermined cell to be activated. In this case, whether a shortened TTI is configured or a normal TTI is configured in the predetermined cell to be activated, the user terminal can apply common control to the deactivation timer. Thus, it is possible to contain changes to the MAC layer, and reduce the growth of the terminal's cost.

Figure 8B:
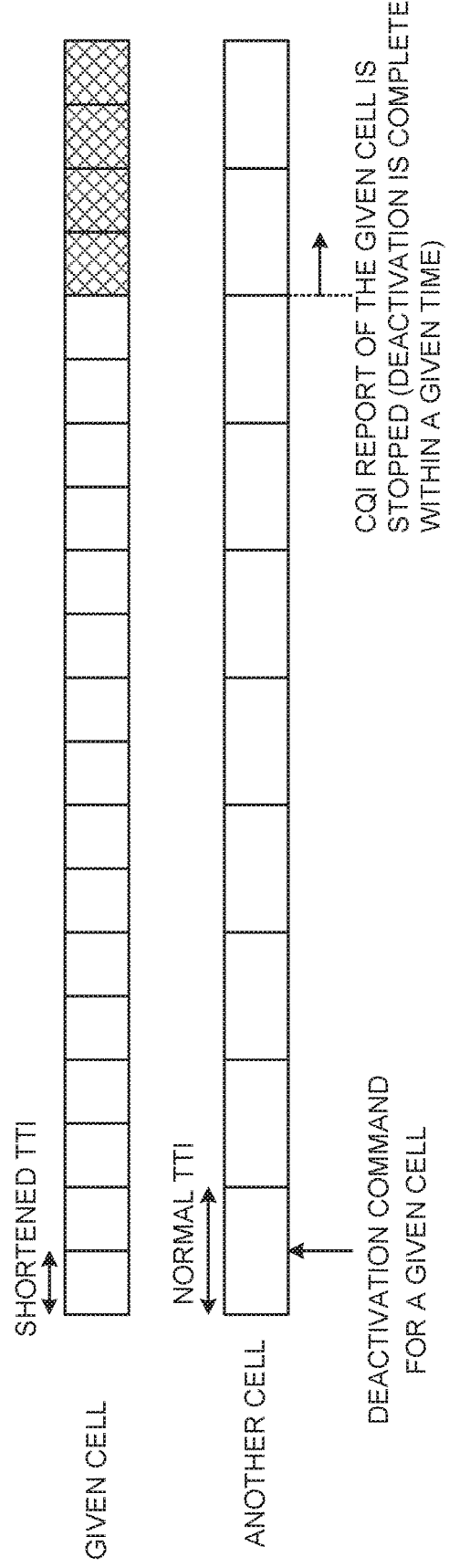

FIG. 8B shows an example of deactivating a predetermined cell in which a shortened TTI is configured. FIG. 8B shows a case where a deactivation command to command deactivation of a predetermined cell (for example, an SCell), in which a shortened TTI is configured, is reported to a user terminal via another cell (for example, a cell in which a normal TTI is configured). Note that another cell here may be a cell in which the same shortened TTI as in the predetermined cell is configured, or may be a cell in which the TTI duration is configured shorter than in the predetermined cell. Obviously, a configuration may be adopted herein in which the deactivation commands is reported to the user terminal in the predetermined cell.

When the user terminal receives the deactivation command for the predetermined cell in which a shortened TTI is configured, the user terminal stops reporting the CSI of the predetermined cell $X_0$ (for example, $X_0$=8 ms) after the timing of receipt. Also, the user terminal exerts control so that deactivation of the predetermined cell is complete within a predetermined time (in $Y_0$ (for example, $Y_0$=24 ms) or in $Z_0$ (for example, $Z_0$=34 ms) from the timing the deactivation command is received).

Thus, in the case illustrated in FIG. 8B, deactivation is controlled regardless of the TTI duration configured in a predetermined cell to be deactivated. In this case, regardless of whether a shortened TTI is configured or a normal TTI is configured in the predetermined cell to be deactivated, the user terminal can apply common control to the deactivation timer. Thus, it is possible to constrain changes to the MAC layer, and reduce the growth of the terminal's cost.

Also, although a case has been illustrated with FIG. 8B where deactivation is performed in response to a deactivation command, the present embodiment is by no means limited to this. The deactivation operation may be controlled based on the expiration of a deactivation timer, not a deactivation command, regardless of the TTI duration in a predetermined cell.

(Radio Communication System)

Now, the structure of a radio communication system according to an embodiment of the present invention will be described below. In this radio communication system, each radio communication method according to the above-described embodiments is employed. Note that the radio communication method according to each embodiment may be used alone or may be used in combination.

Figure 9:
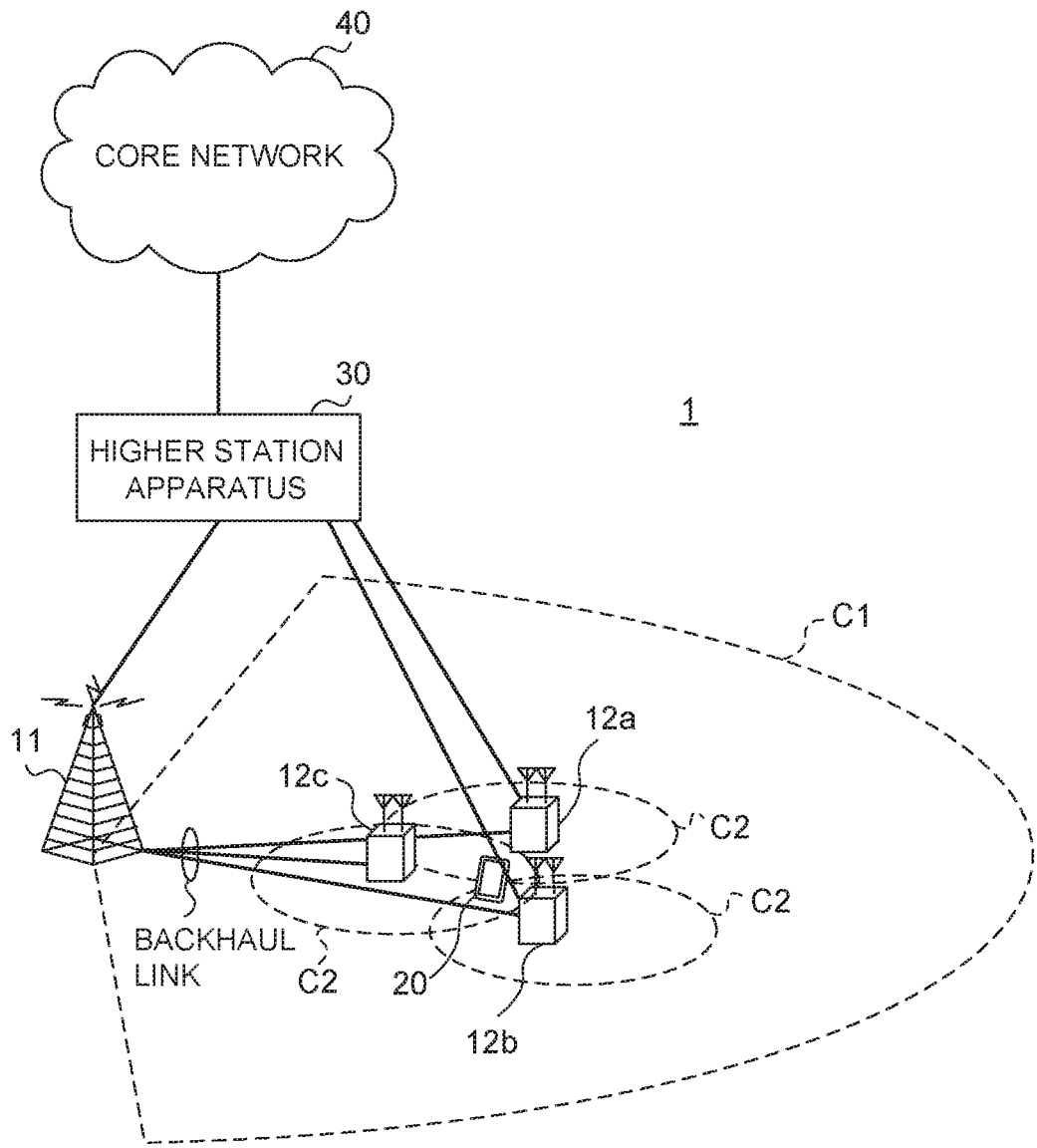
FIG. 9 is a diagram to show an example of a schematic structure of a radio communication system according to an embodiment of the present invention.

FIG. 9 is a diagram to show an example of a schematic structure of a radio communication system according to the present embodiment. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes one unit. Note that the radio communication system 1 may be referred to as "SUPER 3G," "LTE-A" (LTE-Advanced), "IMT-Advanced," "4G," "5G," "FRA" (Future Radio Access), "NR" (New Rat) and so on.

The radio communication system 1 shown in FIG. 9 includes a radio base station 11 that forms a macro cell C1, and radio base stations 12a to 12c that form small cells C2, which are placed within the macro cell C1 and which are narrower than the macro cell C1. Also, user terminals 20 are placed in the macro cell C1 and in each small cell C2. A configuration in which different numerologies are applied between cells may be adopted. Note that a "numerology" refers to a set of communication parameters that characterize the design of signals in a given RAT and the design of the RAT.

The user terminals 20 can connect with both the radio base station 11 and the radio base stations 12. The user terminals 20 may use the macro cell C1 and the small cells C2 at the same time by means of CA or DC. Also, the user terminals 20 can execute CA or DC by using a plurality of cells (CCs) (for example, two or more CCs). Furthermore, the user terminals can use license band CCs and unlicensed band CCs as a plurality of cells. Note that it is possible to adopt a configuration including a TDD carrier, in which shortened TTIs are applied to some of a plurality of cells.

Between the user terminals 20 and the radio base station 11, communication is carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz, 30 to 70 GHz and so on) and a wide bandwidth may be used, or the same carrier as that used in the radio base station 11 may be used. Note that the structure of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between two radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB" (eNodeB), a "transmitting/receiving point" and so on. Also, the radio base stations 12 are radio base stations having local coverages, and may be referred to as "small base stations," "micro base stations," "pico base stations," "femto base stations," "HeNBs" (home eNodeBs), "RRHs" (Remote Radio Heads), "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals or stationary communication terminals.

In the radio communication system 1, as radio access schemes, OFDMA (orthogonal Frequency Division Multiple Access) can be applied to the downlink (DL), and SC-FDMA (Single-Carrier Frequency Division Multiple Access) can be applied to the uplink (UL). OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are not limited to the combinations of these, and OFDMA may be used in UL.

In the radio communication system 1, a DL data channel (PDSCH: Physical Downlink Shared CHannel, which is also referred to as "DL shared channel" and so on), which is used by each user terminal 20 on a shared basis, a broadcast channel (PBCH: Physical Broadcast CHannel), L1/L2 control channels and so on are used as DL channels. User data, higher layer control information and SIBs (System Information Blocks) are communicated in the PDSCH. Also, the MIB (Master Information Block) is communicated in the PBCH.

The L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI), including PDSCH and PUSCH scheduling information, is communicated by the PDCCH. The number of OFDM symbols to use for the PDCCH is communicated by the PCFICH. HARQ delivery acknowledgement information (ACK/NACK) in response to the PUSCH is communicated by the PHICH. The EPDCCH is frequency-division-multiplexed with the PDSCH (downlink shared data channel) and used to communicate DCI and so on, like the PDCCH.

In the radio communication system 1, a UL data channel (PUSCH: Physical Uplink Shared CHannel, which is also referred to as "UL shared channel" and so on), which is used by each user terminal 20 on a shared basis, a UL control channel (PUCCH: Physical Uplink Control CHannel), a random access channel (PRACH: Physical Random Access CHannel) and so on are used as UL channels. User data, higher layer control information and so on are communicated by the PUSCH. Uplink control information (UCI), including at least one of delivery acknowledgment information (ACK/NACK) and radio quality information (CQI), is communicated via the PUSCH or the PUCCH. By means of the PRACH, random access preambles for establishing connections with cells are communicated.

<Radio Base Station>

Figure 10:
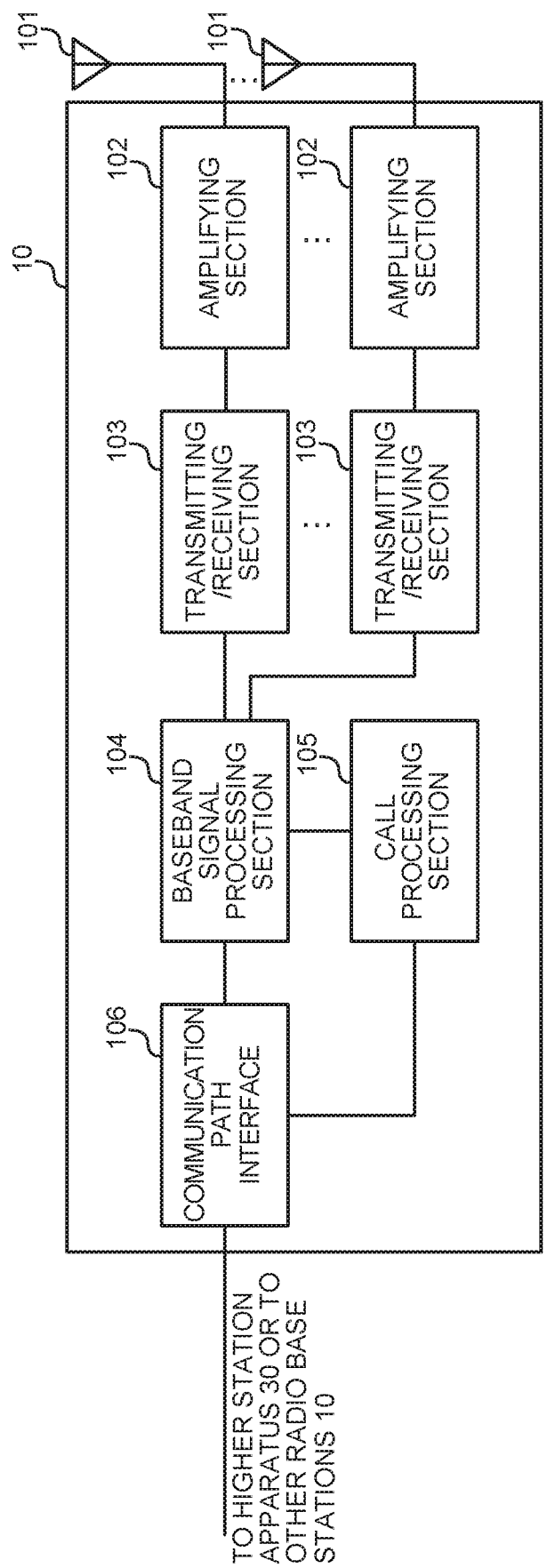
FIG. 10 is a diagram to show an example of a functional structure of a radio base station according to the present embodiment.

FIG. 10 is a diagram to show an example of an overall structure of a radio base station according to the present embodiment. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

DL data to be transmitted from the radio base station 10 to a user terminal 20 is input from the higher station apparatus 30 to the baseband signal processing section 104, via the communication path interface 106.

In the baseband signal processing section 104, the DL data is subjected to transmission processes, including a PDCP (Packet Data Convergence Protocol) layer process, division and coupling of user data, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving sections 103. Furthermore, DL control signals are also subjected to transmission processes such as channel coding and an inverse fast Fourier transform, and forwarded to each transmitting/receiving section 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for UL signals, radio frequency signals that are received in the transmitting/receiving antennas 101 are each amplified in the amplifying sections 102. The transmitting/receiving sections 103 receive the UL signals amplified in the amplifying sections 102. The received signals are converted into the baseband signal through frequency conversion in the transmitting/receiving sections 103 and output to the baseband signal processing section 104.

In the baseband signal processing section 104, user data that is included in the UL signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing such as setting up and releasing communication channels, manages the state of the radio base stations 10 and manages the radio resources.

The communication path interface section 106 transmits and receives signals to and from the higher station apparatus 30 via a predetermined interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

Note that the transmitting/receiving sections 103 transmit DL signals (for example, a DL control signal (DL control channel), a DL data signal (DL data channel, DL shared channel and so on), a DL reference signal (DM-RS, CSI-RS and so on), a discovery signal, a synchronization signal, a broadcast signal and so on), and receive UL signals (for example, a UL control signal (UL control channel), a UL data signal (UL data channel, UL shared channel and so on), a UL reference signal and so on).

To be more specific, the transmitting/receiving sections 103 transmit an activation command and/or a deactivation command directed to a predetermined cell. The transmitting/receiving sections 103 may also transmit information regarding the operation period (latency time) of activation and/or deactivation (at least one of the values of X, Y and Z). Furthermore, based on the TTI duration of the predetermined cell, or based on the TTI duration of the cell where the activation command and/or the deactivation command are transmitted, the transmitting/receiving sections 103 control receipt of UL signals transmitted from the user terminal, and/or transmission of DL signals.

The transmission section and the receiving section of the present invention are comprised of a transmitting/receiving section 103 and/or a communication path interface 106.

Figure 11:
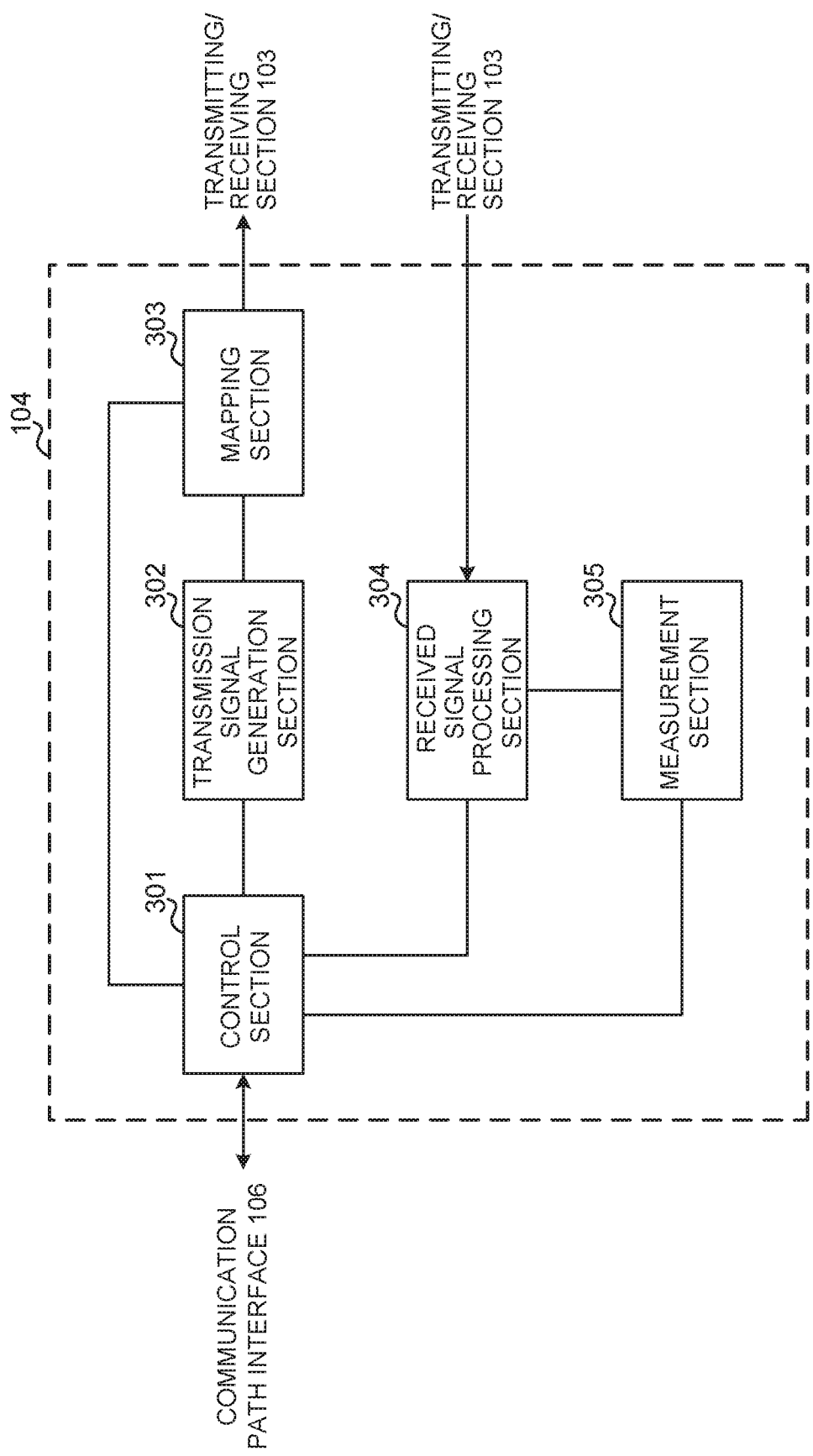
FIG. 11 is a diagram to show an example of a functional structure of a radio base station according to the present embodiment.

FIG. 11 is a diagram to show an example of a functional structure of a radio base station according to the present embodiment. Note that, although FIG. 11 primarily shows functional blocks that pertain to characteristic parts of the present embodiment, the radio base station 10 has other functional blocks that are necessary for radio communication as well. As shown in FIG. 11, the baseband signal processing section 104 at least has a control section 301, a transmission signal generation section 302, a mapping section 303, a received signal processing section 304 and a measurement section 305.

The control section 301 controls the whole of the radio base station 10. The control section 301 can be constituted by a controller, a control circuit or control apparatus that can be described based on general understanding of the technical field to which the present invention pertains.

The control section 301, for example, controls the generation of signals in the transmission signal generation section 302, the allocation of signals by the mapping section 303, and so on. Furthermore, the control section 301 controls the signal receiving processes in the received signal processing section 304, the measurements of signals in the measurement section 305, and so on.

The control section 301 controls the scheduling (for example, resource allocation) of DL signals and/or UL signals. To be more specific, the control section 301 controls the transmission signal generation section 302, the mapping section 303 and the transmitting/receiving sections 103 to generate and transmit DCI (DL assignment) that includes DL data channel scheduling information and DCI (UL grant) that includes UL data channel scheduling information.

The transmission signal generation section 302 generates DL signals (DL control channel, DL data channel, DL reference signals such as DM-RS, and so on) based on commands from the control section 301 and outputs the DL signals to the mapping section 303. The transmission signal generation section 302 can be constituted by a signal generator, a signal generating circuit or signal generating apparatus that can be described based on general understanding of the technical field to which the present invention pertains.

The mapping section 303 maps the DL signals generated in the transmission signal generation section 302 to predetermined radio resources based on commands from the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals are, for example, UL signals that are transmitted from the user terminals 20 (UL control channel, UL data channel, UL reference signals, and so on). For the received signal processing section 304, a signal processor, a signal processing circuit or signal processing apparatus that can be described based on general understanding of the technical field to which the present invention pertains can be used.

The received signal processing section 304 outputs the decoded information acquired through the receiving processes to the control section 301. For example, the received signal processing section 304 outputs at least one of a preamble, control information and UL data to the control section 301. Also, the received signal processing section 304 outputs the received signals, the signals after the receiving processes and so on, to the measurement section 305.

The measurement section 305 conducts measurements with respect to the received signals. The measurement section 305 can be constituted by a measurer, a measurement circuit or measurement apparatus that can be described based on general understanding of the technical field to which the present invention pertains.

Also, by using the received signals, the received signal processing section 304 may measure the received power (for example, RSRP (Reference Signal Received Power)), the received quality (for example, RSRQ (Reference Signal Received Quality)), channel states and so on. The measurement results may be output to the control section 301.

<User Terminal>

Figure 12:
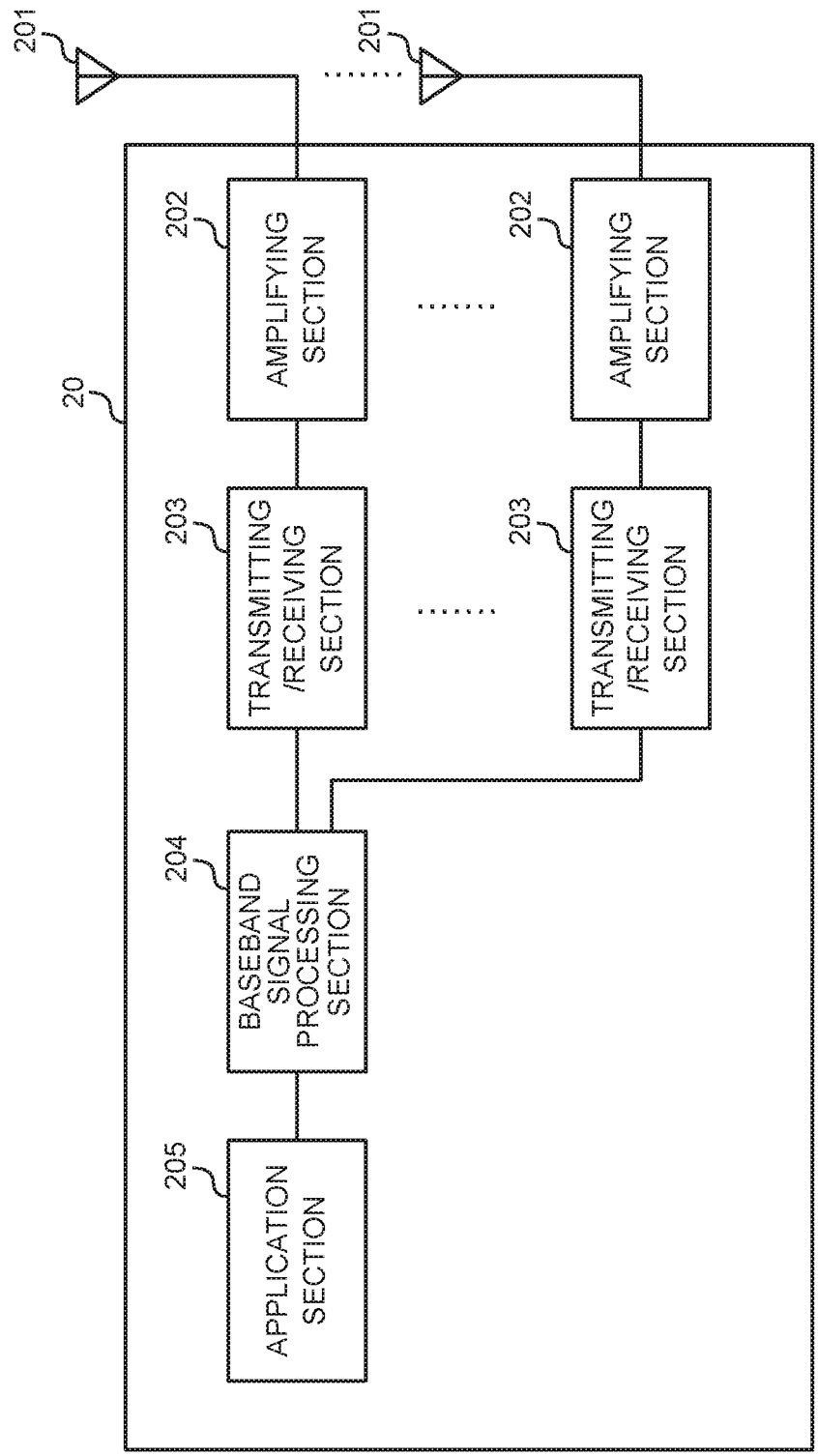
FIG. 12 is a diagram to show an example of a functional structure of a user terminal according to the present embodiment.

FIG. 12 is a diagram to show an example of an overall structure of a user terminal according to the present embodiment. A user terminal 20 has a plurality of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the DL signals amplified in the amplifying sections 202. The received signals are subjected to frequency conversion and converted into the baseband signal in the transmitting/receiving sections 203, and output to the baseband signal processing section 204. A transmitting/receiving section 203 can be constituted by a transmitters/receiver, a transmitting/receiving circuit or transmitting/receiving apparatus that can be described based on general understanding of the technical field to which the present invention pertains. Note that a transmitting/receiving section 203 may be structured as a transmitting/receiving section in one entity, or may be constituted by a transmitting section and a receiving section.

In the baseband signal processing section 204, the baseband signal that is input is subjected to an FFT process, error correction decoding, a retransmission control receiving process and so on. The DL data is forwarded to the application section 205. The application section 205 performs processes related to higher layers above the physical layer and the MAC layer and so on. Also, in the DL data, the system information and the higher layer control information are also forwarded to the application section 205.

Meanwhile, the UL data is input from the application section 205 to the baseband signal processing section 204. The baseband signal processing section 204 performs a retransmission control transmission process (for example, an HARQ transmission process), channel coding, pre-coding, a discrete Fourier transform (DFT) process, an IFFT process and so on, and the result is forwarded to the transmitting/receiving sections 203. Baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

Note that the transmitting/receiving sections 203 transmit DL signals (for example, a DL control signal (DL control channel), a DL data signal (DL data channel, DL shared channel and so on), a DL reference signal (DM-RS, CSI-RS and so on), a discovery signal, a synchronization signal, a broadcast signal and so on), and receive UL signals (for example, a UL control signal (UL control channel), a UL data signal (UL data channel, UL shared channel and so on), a UL reference signal and so on).

To be more specific, the transmitting/receiving sections 203 receive an activation command and/or a deactivation command directed to a predetermined cell. In addition, the transmitting/receiving sections 203 may receive information regarding the operation period (latency time) of activation and/or deactivation (at least one of the values of X, Y and Z), from the radio base station.

Figure 13:
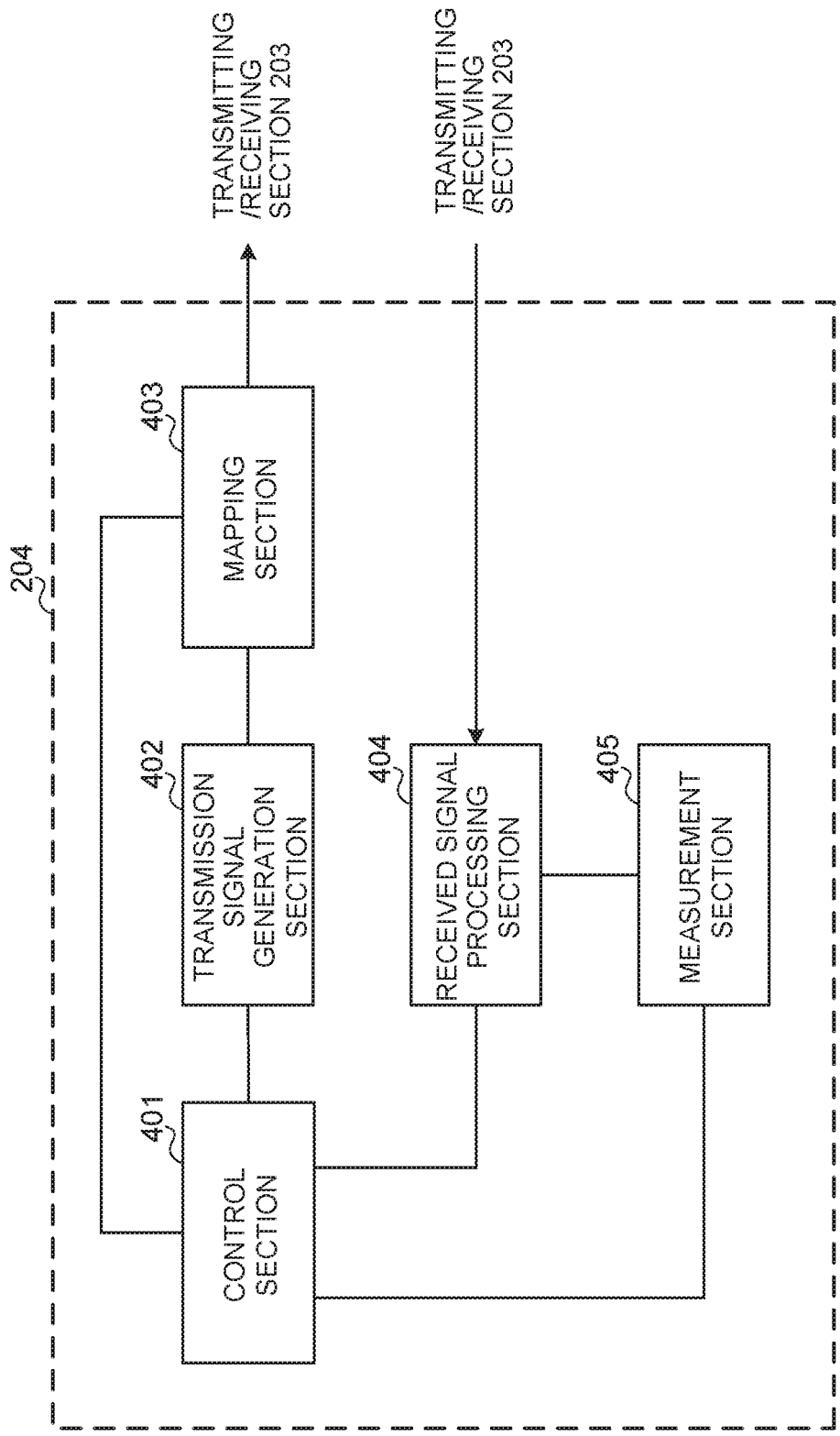
FIG. 13 is a diagram to show an example of a functional structure of a user terminal according to the present embodiment.

FIG. 13 is a diagram to show an example of a functional structure of a user terminal according to the present embodiment. Note that, although FIG. 13 primarily shows functional blocks that pertain to characteristic parts of the present embodiment, the user terminal 20 has other functional blocks that are necessary for radio communication as well. As shown in FIG. 13, the baseband signal processing section 204 provided in the user terminal 20 at least has a control section 401, a transmission signal generation section 402, a mapping section 403, a received signal processing section 404 and a measurement section 405.

The control section 401 controls the whole of the user terminal 20. For the control section 401, a controller, a control circuit or control apparatus that can be described based on general understanding of the technical field to which the present invention pertains can be used.

The control section 401, for example, controls the generation of signals in the transmission signal generation section 402, the allocation of signals by the mapping section 403, and so on. Furthermore, the control section 401 controls the signal receiving processes in the received signal processing section 404, the measurements of signals in the measurement section 405, and so on.

The control section 401 controls activation of a predetermined cell based on an activation command and/or controls deactivation of a predetermined cell based on a deactivation command. For example, the control section 401 controls the operation period (latency time) for activating and/or deactivating a predetermined cell based on the TTI duration in the predetermined cell, or based on the TTI duration of the cell where the activation command and/or the deactivation command are received (see FIG. 5 to FIG. 7).

Also, the control section 401 makes the operation period for activation and/or deactivation of the predetermined cell shorter than the operation period for activation and/or deactivation configured in a cell where the TTI duration is 1 ms. Alternatively, the control section 401 may control the operation period for the predetermined cell's activation and/or deactivation based on the TTI duration that is applied to the channel (for example, a downlink shared channel) in which the activation command and/or the deactivation command are received.

Alternatively, regardless of the TTI duration in the predetermined cell to be activated and/or deactivated, the control section 401 may control activation and/or deactivation by applying the operation period that is configured for activation and/or deactivation when a normal TTI is configured (see FIG. 8).

The transmission signal generation section 402 generates UL signals (UL control channel, UL data channel, UL reference signals and so on) based on commands from the control section 401, and outputs the UL signals to the mapping section 403. The transmission signal generation section 402 can be constituted by a signal generator, a signal generating circuit or signal generating apparatus that can be described based on general understanding of the technical field to which the present invention pertains.

Also, the transmission signal generation section 402 generates the UL data channel based on commands from the control section 401. For example, when a UL grant is included in a DL control channel that is reported from the radio base station 10, the control section 401 commands the transmission signal generation section 402 to generate the UL data channel.

The mapping section 403 maps the UL signals generated in the transmission signal generation section 402 to radio resources based on commands from the control section 401, and output the result to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signal include, for example, DL signals transmitted from the radio base station 10 (DL control channel, DL data channel, DL reference signals and so on). The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

Based on commands from control section 401, the received signal processing section 404 performs blind decoding of the DL control channel, which schedules transmission and/or receipt of the DL data channel, and performs the receiving process of the DL data channel based on this DCI. In addition, the received signal processing section 404 estimates channel gain based on the DM-RS or the CRS, and demodulates the DL data channel based on the estimated channel gain.

The received signal processing section 404 outputs the decoded information, acquired through the receiving processes, to the control section 401. The received signal processing section 404 outputs, for example, broadcast information, system information, RRC signaling, DCI and so on, to the control section 401. The received signal processing section 404 may output the decoding result of the data to the control section 401. Also, the received signal processing section 404 outputs the received signals, the signals after the receiving processes and so on, to the measurement section 405.

The measurement section 405 conducts measurements with respect to the received signals. The measurement section 405 can be constituted by a measurer, a measurement circuit or measurement apparatus that can be described based on general understanding of the technical field to which the present invention pertains.

The measurement section 405 may measure, for example, the received power (for example, RSRP), the DL received quality (for example, RSRQ), the channel states and so on of the received signals. The measurement results may be output to the control section 401.

<Hardware Structure>

Note that the block diagrams that have been used to describe the above embodiments show blocks in functional units. These functional blocks (components) may be implemented in arbitrary combinations of hardware and/or software. Also, the means for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire or wireless, for example) and using these multiple pieces of apparatus.

Figure 14:
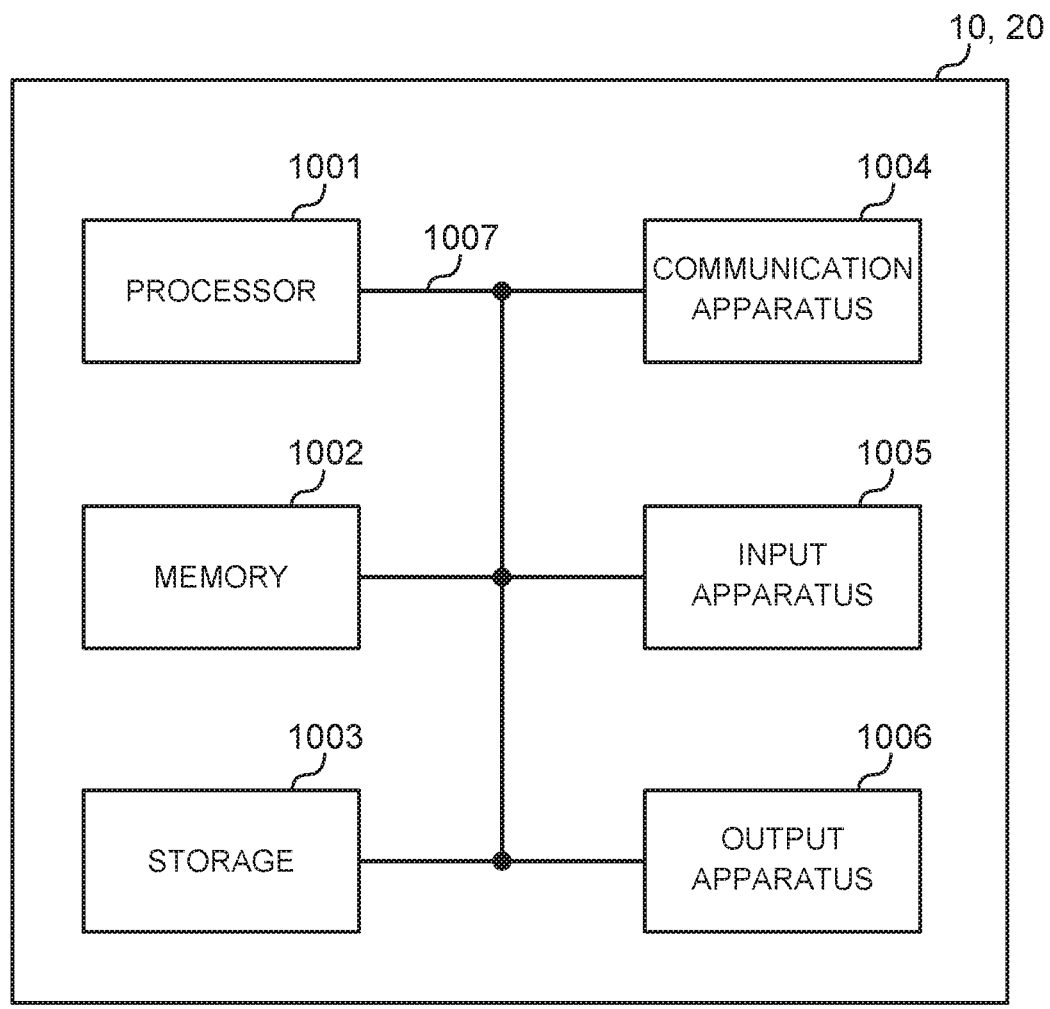
FIG. 14 is a diagram to show an example of a hardware structure of a radio base station and a user terminal according to the present embodiment.

That is, the radio base stations, user terminals and so according to the embodiments of the present invention may function as a computer that executes the processes of the radio communication method of the present invention. FIG. 14 is a diagram to show an example of a hardware structure of a radio base station and a user terminal according to the present embodiment. Physically, a radio base station 10 and a user terminal 20, which have been described, may be formed as computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

For example, although only one processor 1001 is shown, a plurality of processors may be provided. Furthermore, processes may be implemented with one processor, or processes may be implemented in sequence, or in different manners, on two or more processors. Note that the processor 1001 may be implemented with one or more chips.

Each function of the radio base station 10 and the user terminal 20 is implemented by reading predetermined software (program) on hardware such as the processor 1001 and the memory 1002, and by controlling the calculations in the processor 1001, the communication in the communication apparatus 1004, and the reading and/or writing of data in the memory 1002 and the storage 1003.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules or data, from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory" (primary storage apparatus) or the like. The memory 1002 can store executable programs (program codes), software modules, and the like for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving device) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD: Frequency Division Duplex) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these types of apparatus, including the processor 1001, the memory 1002 and others, are connected by a bus 1007 for communicating information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

(Variations)

Note that the terminology used in this specification and the terminology that is needed to understand this specification may be replaced by other terms that convey the same or similar meanings. For example, "channels" and/or "symbols" may be replaced by "signals (or "signaling")." Also, "signals" may be "messages." A reference signal may be abbreviated as an "RS," and may be referred to as a "pilot," a "pilot signal" and so on, depending on which standard applies. Furthermore, a "component carrier" (CC) may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or more slots in the time domain. Furthermore, a slot may be comprised of one or more symbols (OFDM (Orthogonal Frequency Division Multiplexing) symbols, SC-FDMA (Single Carrier Frequency Division Multiple Access) symbols, and so on) in the time domain.

A radio frame, a subframe, a slot and a symbol all represent the time unit in signal communication. A radio frames, a subframe, a slot and a symbol may be each called by other applicable names. For example, one subframe may be referred to as a "transmission time interval (TTI)," or a plurality of consecutive subframes may be referred to as a "TTI," and one slot may be referred to as a "TTI." That is, a subframe and a TTI may be a subframe (1 ms) in existing LTE, may be a shorter period than 1 ms (for example, one to thirteen symbols), or may be a longer period of time than 1 ms.

Here, a TTI refers to the minimum time unit of scheduling in radio communication, for example. For example, in LTE systems, a radio base station schedules the radio resources (such as the frequency bandwidth and transmission power that can be used in each user terminal) to allocate to each user terminal in TTI units. Note that the definition of TTIs is not limited to this. The TTI may be the transmission time unit of channel-encoded data packets (transport blocks), or may be the unit of processing in scheduling, link adaptation and so on.

A TTI having a time duration of one ms may be referred to as a "normal TTI" (TTI in LTE Rel. 8 to 12), a "long TTI," a "normal subframe," a "long subframe," and so on. A TTI that is shorter than a normal TTI may be referred to as a "shortened TTI," a "short TTI," a "shortened subframe," a "short subframe," and so on.

A resource block (RB) is the unit of resource allocation in the time domain and the frequency domain, and may include one or a plurality of consecutive subcarriers in the frequency domain. Also, an RB may include one or more symbols in the time domain, and may be one slot, one subframe or one TTI in length. One TTI and one subframe each may be comprised of one or more resource blocks. Note that an RB may be referred to as a "physical resource block" (PRB: Physical RB), a "PRB pair," an "RB pair" and so on.

Furthermore, a resource block may be comprised of one or more resource elements (REs). For example, one RE may be a radio resource field of one subcarrier and one symbol.

Note that the structures of radio frames, subframes, slots, symbols and the like described above are merely examples. For example, configurations pertaining to the number of subframes included in a radio frame, the number of slots included in a subframe, the number of symbols and RBs included in a slot, the number of subcarriers included in an RB, the number of symbols in a TTI, the symbol duration, the length of cyclic prefixes (CPs) and so on can be variously changed.

Also, the information and parameters described in this specification may be represented in absolute values or in relative values with respect to predetermined values, or may be represented in other information formats. For example, radio resources may be specified by predetermined indices. In addition, equations to use these parameters and so on may be used, apart from those explicitly disclosed in this specification.

The names used for parameters and so on in this specification are in no respect limiting. For example, since various channels (PUCCH (Physical Uplink Control Channel), PDCCH (Physical Downlink Control Channel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Information, signals and so on can be output from higher layers to lower layers and/or from lower layers to higher layers. Information, signals and so on may be input and output via a plurality of network nodes.

The information, signals and so on that are input and/or output may be stored in a specific place (for example, a memory), or may be managed using a management table. The information, signals and so on to be input and/or output can be overwritten, updated or appended. The information, signals and so on that are output may be deleted. The information, signals and so on that are input may be transmitted to other pieces of apparatus.

Reporting of information is by no means limited to the aspects/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (the master information block (MIB), system information blocks (SIBs) and so on), MAC (Medium Access Control) signaling and so on), and signals and/or combinations of these.

Physical layer signaling may be referred to as "L1/L2 (Layer 1/Layer 2) control information" (L1/L2 control signals), "L1 control information" (L1 control signal) and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of predetermined information (for example, reporting of information to the effect that "X holds") does not necessarily have to be sent explicitly, and can be sent implicitly (by, for example, not reporting this piece of information).

Decisions may be made in values represented by one bit (0 or 1), may be made in Boolean values that represent true or false, or may be made by comparing numerical values (for example, comparison against a predetermined value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs: Remote Radio Heads)). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D: Device-to-Device). In this case, user terminals 20 may have the functions of the radio base stations 10 described above. In addition, terms such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Certain actions which have been described in this specification to be performed by base station may, in some cases, be performed by upper nodes. In a network consisting of one or more network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The aspects/embodiments illustrated in this specification may be used individually or in combinations, which may be switched depending on the mode of implementation. The order of processes, sequences, flowcharts and so on that have been used to describe the examples/embodiments herein may be re-ordered as long as inconsistencies do not arise. For example, although various methods have been illustrated in this specification with various components of steps in exemplary orders, the specific orders that are illustrated herein are by no means limiting.

The examples/embodiments illustrated in this specification may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate systems and/or next-generation systems that are enhanced based on these.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used only for convenience, as a method for distinguishing between two or more elements. Thus, reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure, ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical or a combination thereof. As used herein, two elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in the radio frequency, microwave and optical regions (both visible and invisible).

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The invention claimed is:

1. A terminal comprising:
a receiver that receives a command to command at least one of activation and deactivation for a first cell that is configured with a short TTI having a shorter TTI length than a subframe; and
a processor that controls at least one of an activation operation and a deactivation operation of the first cell in units of a subframe based on the command,
wherein the processor determines at least one of the activation operation and the deactivation operation based on the TTI length of a downlink shared channel in which the terminal receives the command.

2. The terminal according to claim 1, wherein when communicating with use of a plurality of cells including the first cell configured with the short TTI and a second cell configured with a longer TTI than the short TTI, the processor controls at least one of the activation operation and the deactivation operation of the first cell and the second cell in units of a subframe based on the command.

3. The terminal according to claim 2, wherein the processor controls, in the first cell, at least one of uplink shared channel transmission and downlink shared channel reception in units of two symbols, three symbols or seven symbols and controls, in the second cell, at least one of uplink shared channel transmission and downlink shared channel reception in units of a subframe.

4. A radio communication method for a terminal, comprising:
receiving a command to command at least one of activation and deactivation for a first cell that is configured with a short TTI having a shorter TTI length than a subframe; and
controlling at least one of an activation operation and a deactivation operation of the first cell in units of a subframe based on the command,
wherein the terminal determines at least one of the activation operation and the deactivation operation based on the TTI length of a downlink shared channel in which the terminal receives the command.

5. A base station comprising:
a transmitter that transmits a command to command at least one of activation and deactivation for a first cell that is configured with a short TTI having a shorter TTI length than a subframe; and
a processor that controls at least one of an activation operation and a deactivation operation of the first cell in units of a subframe based on the command,
wherein the processor determines at least one of the activation operation and the deactivation operation based on the TTI length of an uplink shared channel in which the base station receives the command.

* * * * *